(12) United States Patent
Yoon et al.

(10) Patent No.: US 12,348,669 B2
(45) Date of Patent: Jul. 1, 2025

(54) ELECTRONIC DEVICE AND METHOD FOR MANAGING CONTACTS THEREOF

(71) Applicant: SAMSUNG ELECTRONICS CO., LTD., Suwon-si (KR)

(72) Inventors: Seokho Yoon, Suwon-si (KR); Mina Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 232 days.

(21) Appl. No.: 18/087,027

(22) Filed: Dec. 22, 2022

(65) Prior Publication Data

US 2023/0120114 A1 Apr. 20, 2023

Related U.S. Application Data

(63) Continuation of application No. PCT/KR2021/016206, filed on Nov. 9, 2021.

(30) Foreign Application Priority Data

Nov. 9, 2020 (KR) ........................ 10-2020-0148735

(51) Int. Cl.
*H04M 3/42* (2006.01)

(52) U.S. Cl.
CPC ... *H04M 3/42025* (2013.01); *H04M 3/42348* (2013.01)

(58) Field of Classification Search
None
See application file for complete search history.

(56) References Cited

U.S. PATENT DOCUMENTS

| 8,616,458 B2 | 12/2013 | Suki |
| 8,719,873 B2 | 5/2014 | Nathan et al. |
| 8,723,795 B2 | 5/2014 | Underkoffler et al. |
| 8,734,546 B2 | 5/2014 | McAlister |

(Continued)

FOREIGN PATENT DOCUMENTS

| CN | 109981389 | 7/2019 |
| JP | 2015-069320 | 4/2015 |

(Continued)

OTHER PUBLICATIONS

International Search Report dated Mar. 7, 2022 in PCT/KR2021/016206, 4 pages.

(Continued)

*Primary Examiner* — Quoc D Tran
(74) *Attorney, Agent, or Firm* — Nixon & Vanderhye, P.C.

(57) ABSTRACT

Various embodiments of the present disclosure relate to an electronic device and a method for managing a contact thereof. The electronic device can include: at least one processor, and a memory operatively coupled to the at least one processor. The memory can store instructions which, when executed, cause the at least one processor to: collect data related to a contact of a specified user, extract at least one piece of individual feature information by analyzing the collected data, provide differentiated individual identity information by comparing the extracted individual feature information with individual feature information of other users, and store the provided individual identity information in the memory in conjunction with the contact of the specific user.

20 Claims, 19 Drawing Sheets

(56) References Cited

U.S. PATENT DOCUMENTS

| | | |
|---|---|---|
| 8,761,363 B2 | 6/2014 | Rajagopalan et al. |
| 8,762,469 B2 | 6/2014 | Lindahl |
| 8,775,969 B2 | 7/2014 | Fan |
| 8,788,492 B2 | 7/2014 | Lu et al. |
| 8,798,251 B2 | 8/2014 | Rajagopalan et al. |
| 8,798,584 B1 | 8/2014 | Swan |
| 8,812,015 B2 | 8/2014 | Das et al. |
| 8,818,892 B1 | 8/2014 | Sprague et al. |
| 8,855,614 B2 | 10/2014 | Varoglu |
| 8,856,014 B2 | 10/2014 | Agarwal et al. |
| 8,869,241 B2 | 10/2014 | Davis et al. |
| 8,879,713 B2 | 11/2014 | Jaiswal et al. |
| 8,886,206 B2 | 11/2014 | Lord et al. |
| 8,903,716 B2 | 12/2014 | Chen et al. |
| 8,941,590 B2 | 1/2015 | Csaszar et al. |
| 9,080,207 B2 | 1/2015 | Handique et al. |
| 8,955,800 B2 | 2/2015 | McGeer et al. |
| 8,972,368 B1 | 3/2015 | de Sousa |
| 8,977,639 B2 | 3/2015 | Petrou et al. |
| 8,993,233 B2 | 3/2015 | Zhang et al. |
| 8,995,022 B1 | 3/2015 | Vronsky et al. |
| 8,998,554 B2 | 4/2015 | Toebes et al. |
| 9,005,561 B2 | 4/2015 | Leta et al. |
| 9,008,884 B2 | 4/2015 | Toebes et al. |
| 9,024,766 B2 | 5/2015 | Hood et al. |
| 9,027,135 B1 | 5/2015 | Aziz |
| 9,032,456 B2 | 5/2015 | Pierson et al. |
| 9,040,288 B2 | 5/2015 | Handique et al. |
| 9,043,150 B2 | 5/2015 | Forstall et al. |
| 9,050,253 B2 | 6/2015 | Tamarkin et al. |
| 9,055,254 B2 | 6/2015 | Selim |
| 9,094,516 B2 | 7/2015 | Williams |
| 9,096,375 B2 | 8/2015 | Lert et al. |
| 9,105,032 B2 | 8/2015 | Altberg et al. |
| 9,107,378 B2 | 8/2015 | Hofman et al. |
| 9,121,851 B2 | 9/2015 | Burd et al. |
| 9,167,089 B2 | 10/2015 | Wilhelm |
| 9,192,776 B2 | 11/2015 | Hummel et al. |
| 9,196,133 B2 | 11/2015 | Scalisi et al. |
| 9,202,219 B2 | 12/2015 | Van Der Linden et al. |
| 9,222,284 B2 | 12/2015 | Gokcebay |
| 9,237,291 B2 | 1/2016 | Selim |
| 9,266,370 B2 | 2/2016 | Jung et al. |
| 9,275,126 B2 | 3/2016 | Smith et al. |
| 9,278,177 B2 | 3/2016 | Edwards et al. |
| 9,321,531 B1 | 4/2016 | Takayama et al. |
| 9,323,894 B2 | 4/2016 | Kiani |
| 9,327,810 B2 | 5/2016 | Zediker et al. |
| 9,327,903 B2 | 5/2016 | Toebes et al. |
| 9,330,196 B2 | 5/2016 | Luna |
| 9,349,552 B2 | 5/2016 | Huska et al. |
| 9,355,183 B2 | 5/2016 | Williams |
| 9,383,855 B2 | 7/2016 | Westerman et al. |
| 9,390,364 B2 | 8/2016 | Finn et al. |
| 9,417,754 B2 | 8/2016 | Smith |
| 9,420,093 B2 | 8/2016 | Won |
| 9,426,272 B2 | 8/2016 | Karaoguz |
| 9,426,296 B2 | 8/2016 | Chishti et al. |
| 9,434,854 B2 | 9/2016 | Swift et al. |
| 9,435,793 B2 | 9/2016 | Burd et al. |
| 9,440,349 B2 | 9/2016 | Criswell |
| 9,454,665 B1 | 9/2016 | Wren et al. |
| 9,462,415 B2 | 10/2016 | Jung et al. |
| 9,464,207 B2 | 10/2016 | Swift et al. |
| 9,471,691 B1 | 10/2016 | de Sousa |
| 9,471,925 B2 | 10/2016 | Ramer et al. |
| 9,476,164 B2 | 10/2016 | Penland, Jr. et al. |
| 9,491,497 B2 | 11/2016 | Perez |
| 9,495,537 B2 | 11/2016 | Gupta et al. |
| 9,520,638 B2 | 12/2016 | Baringer et al. |
| 9,525,223 B2 | 12/2016 | Little et al. |
| 9,529,864 B2 * | 12/2016 | Sundelin ............ G06F 16/24575 |
| 9,530,067 B2 | 12/2016 | Ye |
| 9,542,442 B2 | 1/2017 | Meiyyappan et al. |
| 9,558,677 B2 | 1/2017 | Sadeh-Koniecpol et al. |
| 9,565,296 B2 | 2/2017 | Filonov et al. |
| 9,565,311 B2 | 2/2017 | Pickering |
| 9,601,356 B2 | 3/2017 | Bower et al. |
| 9,633,057 B2 | 4/2017 | Glidden |
| 9,646,199 B2 | 5/2017 | Bose et al. |
| 9,650,138 B2 | 5/2017 | Yates |
| 9,661,133 B2 | 5/2017 | Jung |
| 9,667,691 B2 | 5/2017 | Ding et al. |
| 9,694,975 B2 | 7/2017 | Lert et al. |
| 9,710,807 B2 | 7/2017 | Theurer et al. |
| 9,719,797 B2 | 8/2017 | Fino et al. |
| 9,737,954 B2 | 8/2017 | Hoffa et al. |
| 9,762,601 B2 | 9/2017 | Truong et al. |
| 9,799,794 B2 | 10/2017 | Bower et al. |
| 9,804,928 B2 | 10/2017 | Davis et al. |
| 9,805,129 B2 | 10/2017 | Williams |
| 9,805,320 B2 | 10/2017 | Pattabhiraman et al. |
| 9,824,408 B2 | 11/2017 | Isaacson et al. |
| 9,852,150 B2 | 12/2017 | Sharpe et al. |
| 9,908,760 B2 | 3/2018 | High et al. |
| 9,919,512 B2 | 3/2018 | Jung et al. |
| 9,929,053 B2 | 3/2018 | Bower et al. |
| 9,932,137 B2 | 4/2018 | Lancaster, III et al. |
| 9,933,937 B2 | 4/2018 | Lemay et al. |
| 9,946,254 B2 | 4/2018 | Toda |
| 9,947,584 B2 | 4/2018 | Bower et al. |
| 9,955,003 B2 | 4/2018 | Cody et al. |
| 9,965,074 B2 | 5/2018 | Bernstein et al. |
| 9,970,708 B2 | 5/2018 | Zielinski et al. |
| 9,996,586 B2 | 6/2018 | Chen et al. |
| 10,007,340 B2 | 6/2018 | Cruz-Hernandez et al. |
| 10,027,806 B2 | 7/2018 | Williams |
| 10,064,022 B2 | 8/2018 | Moon et al. |
| 10,068,728 B2 | 9/2018 | Huska et al. |
| 10,074,048 B2 | 9/2018 | Selgrath et al. |
| 10,109,061 B2 | 10/2018 | Bose et al. |
| 10,113,167 B2 | 10/2018 | Doudna et al. |
| 10,142,351 B1 | 11/2018 | Wren et al. |
| 10,182,154 B2 | 1/2019 | Pickering |
| 10,204,244 B2 | 2/2019 | Butler et al. |
| 10,220,717 B2 | 3/2019 | Ricci |
| 10,239,739 B2 | 3/2019 | High et al. |
| 10,241,644 B2 | 3/2019 | Gruber et al. |
| 10,255,566 B2 | 4/2019 | Gruber et al. |
| 10,276,170 B2 | 4/2019 | Gruber et al. |
| 10,345,625 B2 | 7/2019 | Howell et al. |
| 10,361,124 B2 | 7/2019 | Bower et al. |
| 10,379,728 B2 | 8/2019 | Van Os et al. |
| 10,382,627 B2 | 8/2019 | Williams |
| 10,425,538 B2 | 9/2019 | Altberg et al. |
| 10,429,204 B2 | 10/2019 | Hoffman et al. |
| 10,458,283 B2 | 10/2019 | Laughlin et al. |
| 10,547,739 B2 | 1/2020 | Cody et al. |
| 10,572,786 B1 | 2/2020 | Smartt et al. |
| 10,594,818 B2 | 3/2020 | Gosalia |
| 10,673,806 B1 * | 6/2020 | Srinivasan ........ H04M 1/7243 |
| 2010/0216442 A1 * | 8/2010 | Kim ............... H04M 1/575 |
| | | 455/415 |
| 2012/0004015 A1 * | 1/2012 | Le Thierry D'Ennequin ............ |
| | | H04W 4/029 |
| | | 455/566 |
| 2013/0227031 A1 | 8/2013 | Wells et al. |
| 2013/0268361 A1 | 10/2013 | Urbanski |
| 2014/0006968 A1 | 1/2014 | Fox et al. |
| 2014/0122522 A1 | 5/2014 | Ganapathy et al. |
| 2014/0129537 A1 | 5/2014 | Spio |
| 2014/0144992 A1 | 5/2014 | Diorio et al. |
| 2014/0179290 A1 * | 6/2014 | Jung .................. H04W 4/18 |
| | | 455/566 |
| 2014/0258325 A1 | 9/2014 | Fan |
| 2014/0294167 A1 * | 10/2014 | Kim .................. H04M 1/724 |
| | | 379/142.17 |
| 2014/0349690 A1 * | 11/2014 | Yang ............... H04M 1/27453 |
| | | 455/466 |
| 2015/0066911 A1 | 3/2015 | Seo et al. |
| 2015/0069137 A1 | 3/2015 | O'Brien et al. |
| 2015/0156322 A1 | 6/2015 | Lee et al. |
| 2015/0234938 A1 | 8/2015 | Zhang et al. |
| 2015/0235330 A1 | 8/2015 | Polston et al. |

(56) References Cited

U.S. PATENT DOCUMENTS

| | | | |
|---|---|---|---|
| 2015/0237467 A1 | 8/2015 | Jung et al. |
| 2015/0248604 A1 | 9/2015 | Diorio et al. |
| 2016/0231877 A1 | 8/2016 | Matthes et al. |
| 2016/0335350 A1 | 11/2016 | Bawri et al. |
| 2017/0083961 A1 | 3/2017 | Polston et al. |
| 2017/0272401 A1 | 9/2017 | Brockington et al. |
| 2017/0272402 A1 | 9/2017 | Deng |
| 2017/0353602 A1* | 12/2017 | DeLuca | H04L 51/48 |
| 2018/0053125 A1 | 2/2018 | Pattabhiraman et al. |
| 2018/0144164 A1 | 5/2018 | DeBates et al. |
| 2018/0181664 A1 | 6/2018 | Williams |
| 2018/0357269 A1 | 12/2018 | Yoon |
| 2019/0045050 A1 | 2/2019 | Gallagher et al. |
| 2019/0306319 A1 | 10/2019 | Hansen |
| 2020/0065423 A1 | 2/2020 | Lin |
| 2020/0374391 A1 | 11/2020 | Murgrabia et al. |
| 2020/0409926 A1* | 12/2020 | Srinivasan | G06F 16/383 |

FOREIGN PATENT DOCUMENTS

| | | |
|---|---|---|
| KR | 20110085853 A | 7/2011 |
| KR | 10-2014-0082440 | 7/2014 |
| KR | 10-2015-0025988 | 3/2015 |
| KR | 10-2015-0096832 | 8/2015 |
| KR | 10-2016-0005563 | 1/2016 |
| KR | 10-2016-0050493 | 5/2016 |
| KR | 10-2016-0107495 | 9/2016 |
| KR | 10-2017-0002108 | 1/2017 |
| KR | 10-2017-0047956 | 5/2017 |
| KR | 10-2017-0047994 | 5/2017 |
| KR | 10-2018-0051015 | 5/2018 |
| KR | 10-2018-0060725 | 6/2018 |
| KR | 10-2019-0075310 | 7/2019 |
| KR | 10-2019-0079174 | 7/2019 |
| KR | 10-2019-0098479 | 8/2019 |
| KR | 10-2003740 | 10/2019 |
| KR | 10-2020-0021402 | 2/2020 |
| KR | 10-2163685 | 10/2020 |

OTHER PUBLICATIONS

Written Opinion dated Mar. 7, 2022 in PCT/KR2021/016206, 4 pages.

Office Action dated Dec. 18, 2024 in KR Application No. 10-2020-0148735 and English-language translation.

* cited by examiner

410

| CONTACT | INDIVIDUAL FEATURE KEYWORD |
|---|---|
| CHEONGDAM APRIL | ENGLISH TEXTBOOK, ENGLISH HOMEWORK, PROGRESS TABLE, LIVE LESSON, CURRICULUM, PHONE |
| SAMSUNG KINDERGARTEN | TEACHER, GOING TO SCHOOL, LOVE CLASS, ENGLISH HOMEWORK, PHONE, LEAVING KINDERGARTEN |
| EUNWOO'S MOTHER | WORKING MOM, PARENTING, LOVE CLASS, KIDS CAFE, ENGLISH HOMEWORK, PHONE, GOING TO SCHOOL, LEAVING KINDERGARTEN |
| SENIOR PARK | TASK, PROGRAM, OFF WORK, LUNCH, HEALTH, PHONE |
| JUNIOR KIM | BIXBY, TASK, VACATION, OFF WORK, LUNCH, MUSIC, HEALTH, PHONE |

420

| CONTACT | INDIVIDUAL FEATURE KEYWORD |
|---|---|
| CHEONGDAM APRIL | PROGRESS TABLE, LIVE LESSON, CURRICULUM, ENGLISH TEXTBOOK, ENGLISH HOMEWORK, PHONE |
| SAMSUNG KINDERGARTEN | LOVE CLASS, TEACHER, GOING TO SCHOOL, LEAVING KINDERGARTEN, ENGLISH HOMEWORK, PHONE |
| EUNWOO'S MOTHER | WORKING MOM, PARENTING, KIDS CAFE, TEACHER, GOING TO SCHOOL, LEAVING KINDERGARTEN, ENGLISH HOMEWORK, PHONE |
| SENIOR PARK | PROGRAM, LUNCH, TASK, OFF WORK, HEALTH, PHONE |
| JUNIOR KIM | BIXBY, MUSIC, LUNCH, VACATION, OFF WORK, HEALTH, PHONE |

FIG.4B

| CONTACT | CALL TIME |
|---|---|
| SENIOR PARK | 2020-04-10 10:00:00~2020-04-10 10:05:00 |
| JUNIOR KIM | 2020-04-10 10:06:00~2020-04-10 10:10:00 |
| CALI | 2020-04-11 12:01:00~2020-04-11 12:02:00 |
| JONATHAN | 2020-04-11 18:05:00~2020-04-11 18:07:00 |
| SENIOR PARK | 2020-04-12 11:10:00~2020-04-12 11:15:00 |
| JUNIOR KIM | 2020-04-10 11:16:00~2020-04-12 11:20:00 |

RELATIONSHIP (522)

[510]

[520]

[530]

| CONTACT | INDIVIDUAL IDENTITY KEYWORD | |
|---|---|---|
| CHEONGDAM APRIL | ENGLISH TEXTBOOK, ENGLISH HOMEWORK, PROGRESS TABLE, LIVE LESSON, CURRICULUM | Group 1 |
| JUBILEE LANGUAGE SCHOOL | HOMEWORK, ENGLISH TEXTBOOK, SCIENCE TEXTBOOK | |
| KIM SAM-SUNG | TASK, BIXBY, OFF WORK, LUNCH, MUSIC | Group 2 |
| SENIOR PARK | TASK, PROGRAM, OFF WORK, LUNCH, HEALTH | |
| JUNIOR KIM | BIXBY, TASK, VACATION, LUNCH, OFF WORK | |
| TAEKWONDO ACADEMY | TAEKWONDO, MANAGER, MASTER, VEHICLE SUPPORT | |

FIG.5D

ELECTRONIC DEVICE AND METHOD FOR MANAGING CONTACTS THEREOF

CROSS-REFERENCE TO RELATED APPLICATIONS

This application is a continuation of International Application No. PCT/KR2021/016206 designating the United States, filed on Nov. 9, 2021, in the Korean Intellectual Property Receiving Office and claiming priority to Korean Patent Application No. 10-2020-0148735, filed on Nov. 9, 2020, in the Korean Intellectual Property Office, the disclosures of which are incorporated by reference herein in their entireties.

BACKGROUND

Field

The disclosure relates to an electronic device and a method for managing a contact thereof.

Description of Related Art

An electronic device (e.g., a mobile terminal, a smart phone, or a wearable terminal) can provide various functions. For example, the electronic device can provide a photographing function, a music play function, a navigation function, a call function, a short-range wireless communication (e.g., Bluetooth, Wi-Fi, or near field communication (NFC)) function, or an electronic payment function.

The electronic device can provide a function of storing and searching for a contact. The electronic device can provide various methods for registering a contact, in addition to directly registering a contact by a user. For example, the electronic device can automatically register a contact by photographing (or scanning) a business card, and can automatically register a contact by receiving the contact from another electronic device through short-distance communication. Since it is possible to easily register the contact as described above, a user of the electronic device can store numerous contacts in the electronic device.

In general, an electronic device can search for a contact with a criterion of a name, a nickname or at least a portion of a contact (e.g., a phone number), which is registered at the time of storing the contact. Accordingly, it may be inconvenient for the user of the electronic device to search for the contact. For example, when failing to accurately remember the name, the nickname or the portion of the contact which is registered at the time of storing the contact, it may be difficult to quickly contact the other party, because the user of the electronic device cannot immediately find a desired contact of the other party.

SUMMARY

Embodiments of the disclosure provide an electronic device and a method for managing a contact thereof, for extracting (providing) individual identity information able to differentiate each other party from data related to each other party, storing the individual identity information in association with a contact of each other party, and searching for a contact using the individual identity information.

An electronic device according to various example embodiments of the present disclosure, for example, can include: at least one processor, and a memory operatively connected to the at least one processor. The memory can store instructions which, when executed, cause the at least one processor to: collect data related to a contact of a specified user, extract at least one piece of individual feature information by analyzing the collected data, provide differentiated individual identity information by comparing the extracted individual feature information with individual feature information of other users, and store the provided individual identity information in the memory in association with the contact of the specific user.

A method for managing a contact in an electronic device according to various example embodiments of the present disclosure, for example, can include: collecting data related to a contact of a specified user, extracting at least one piece of individual feature information by analyzing the collected data, providing differentiated individual identity information by comparing the extracted individual feature information with individual feature information of other users, and storing the provided individual identity information in association with a contact of the specific user.

An electronic device according to various example embodiments of the present disclosure can provide individual identity information capable of being differentiated from other contacts, store the same in association with each contact, and search for a contact using the individual identity information. In various example embodiments of the present disclosure, even if failing to accurately remember information (e.g., a name, a nickname or a phone number) registered to a contact list, a user of the electronic device can search for a contact through approximate information related to the other party (e.g., a word frequently used in conversation with the other party, a location (or place) of conversation, relationship information (e.g., a senior of A, a junior of B, and/or a cousin), and context information at conversation) and thus, can improve a user's convenience. Various embodiments of the present disclosure can improve a user satisfaction with the electronic device.

In addition, various effects directly or indirectly identified through the present document can be provided.

BRIEF DESCRIPTION OF THE DRAWINGS

FIG. 4B is a diagram illustrating an example of providing an individual identity keyword in an electronic device according to various embodiments;

FIG. 5D is a diagram illustrating an example of providing an individual identity relationship using an individual identity keyword according to various embodiments;

DETAILED DESCRIPTION

Figure 1:
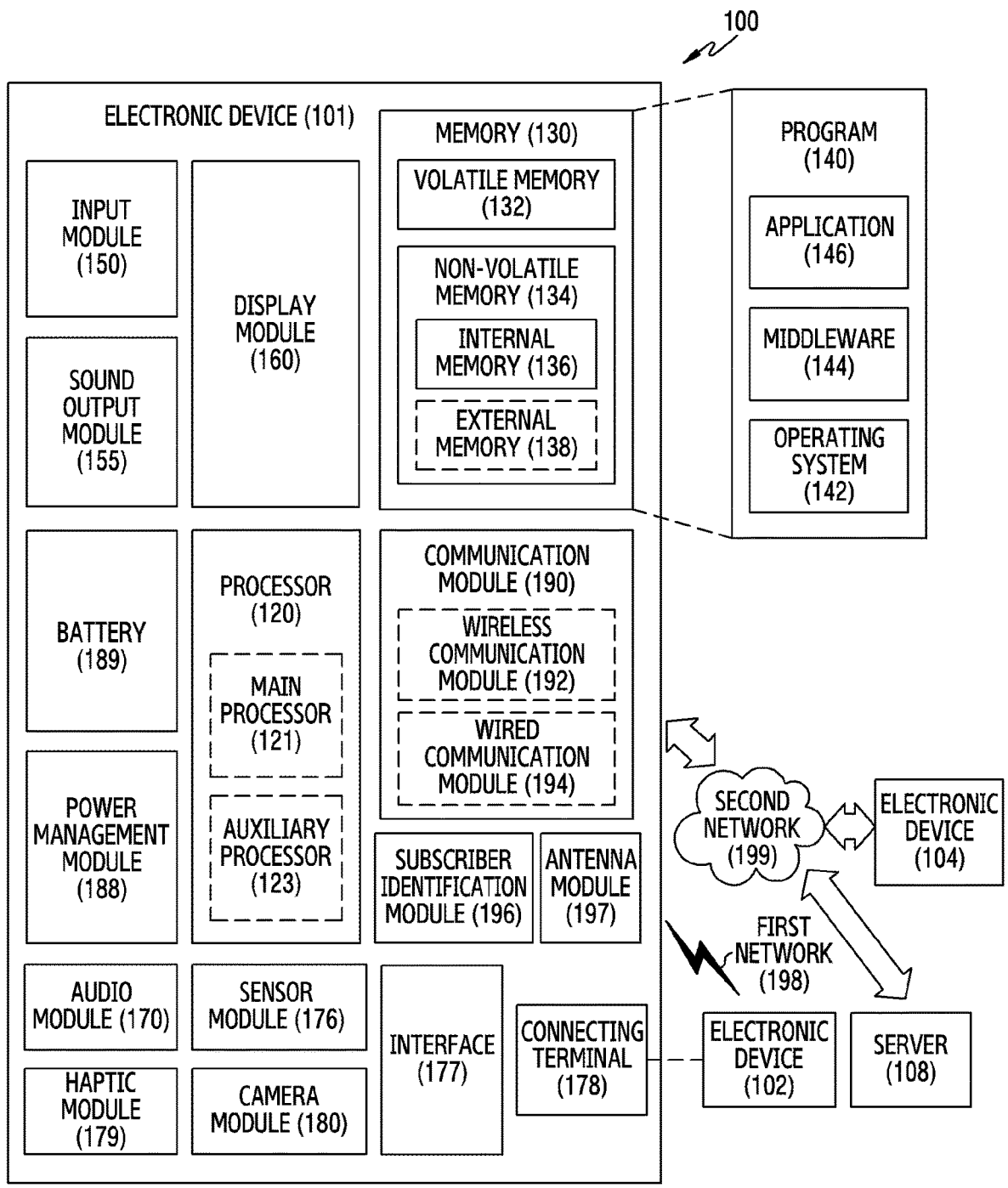
FIG. 1 is a block diagram illustrating an example electronic device in a network environment according to various embodiments.

Various example embodiments of the present disclosure will be described below with reference to the accompanying drawings. In the disclosure, various example embodiments are illustrated in the drawings and a related detailed description is described, but this is not intended to limit the various embodiments of the present disclosure to a specific form. For example, various modifications of embodiments of the present disclosure will be apparent to those having ordinary skill in the art to which the present disclosure pertains.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
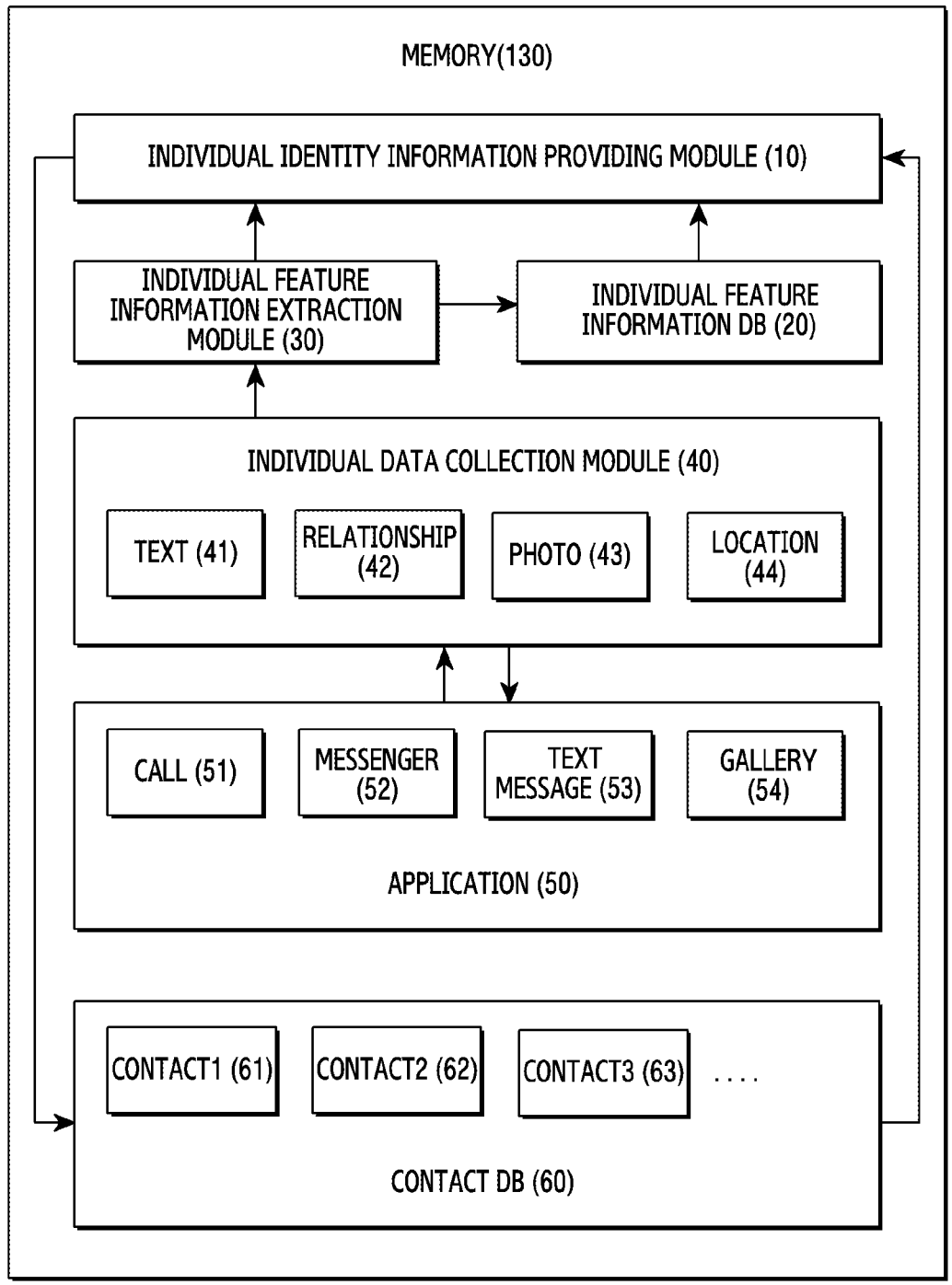
FIG. 2 is a block diagram illustrating an example configuration of a memory of FIG. 1 according to various embodiments.

FIG. 2 is a diagram illustrating an example configuration of the memory of FIG. 1 according to various embodiments.

Referring to FIG. 2, the memory 130 of various embodiments of the present disclosure can include various modules, each of which, in use, may include various processing circuitry and/or executable program elements. The modules can include an individual identity information providing module 10, an individual feature information database (DB) 20, an individual feature information extraction module 30, an individual data collection module 40, an application 50, and/or a contact DB 60.

According to an embodiment, the contact DB 60 can store a contact of at least one user. For example, the contact DB 60 can store a contact 61 of a first user, a contact 62 of a second user, and a contact 63 of a third user. Each contact can include name, nickname, phone number, email, address, memo, and/or group information. According to an embodiment, each contact can include individual identity information. According to some embodiment, the individual identity information can be separately stored in association with each contact.

According to an embodiment, the application 50 (e.g., the application 146) can be embedded when the electronic device 101 is manufactured, or can be downloaded and installed. The application 50 can include, for example, a call application 51, a messenger application 52, a text message application 53, and a gallery application 54. This is only an example, and the memory 130 can further include various applications.

According to an embodiment, the individual data collection module 40 can collect data related to each user (or contact) from various applications. For example, the individual data collection module 40 can collect, by each user, data related to a text 41, a relationship 42, a photo 43, and/or a location 44 from various applications.

According to an embodiment, the individual data collection module 40 can collect text data 41, by converting voice information related to call content collected through the call application 51 into a text, and can collect text data 41 related to conversation content collected through the messenger application 52 and the text message application 53. The individual data collection module 40 can collect relationship data 42 of respective users through group information stored in the contact DB 60 and/or a keyword (e.g., father, brother, mother, younger brother, senior, junior) included in call or conversation content. The individual data collection module 40 can collect photo data 43 related to each user through the gallery application 54 (e.g., can search for a photo including each user through face recognition). The individual data collection module 40 can collect location data 44 when the application 50 is used, through a location information receiving module (e.g., GPS, GNSS).

According to an embodiment, the individual data collection module 40 can collect, by each user, data related to a context when the application 50 is used, through a sensor module (e.g., the sensor module 176).

According to an embodiment, the individual feature information extraction module 30 can analyze the data collected through the individual data collection module 40, and extract feature information (hereinafter, individual feature information) of each user. The individual feature information can include a keyword, a relationship, a location, and a context.

For example, the individual feature information extraction module 30 can extract, as a keyword, a word (e.g., a word used at a specified number of times (e.g., 3 times) or more) frequently used for each user, on the basis of text information collected by the individual data collection module 40 (e.g., call content collected from the call application 51, or conversation content collected from the messenger application 52 and the text message application 53).

As another example, the individual feature information extraction module 30 can extract a relationship between respective users, on the basis of a photo (e.g., a photo included in the gallery application 54), a call time, and/or a call frequency collected by the individual data collection module 40.

As a further example, the individual feature information extraction module 30 can extract, as location information, a location of the electronic device 101 when the application 50 is used. According to some embodiment, the individual feature information extraction module 40 can extract place information corresponding to a location.

As yet another example, the individual feature information extraction module 30 can extract, as context information, context information (e.g., while driving, before sleep, or going to work) acquired through the sensor module (e.g., the sensor module 176).

As still another example, the individual feature information extraction module 30 can extract information related to each user's gender and/or each user's age group, through each user's photo, a social network service (SNS) stored in a contact, and/or a conversation content.

According to an embodiment, the individual feature information DB 20 can store, by each user, individual feature information extracted by the individual feature information extraction module 30. The individual feature information can be stored for a predetermined period (e.g., one month).

According to an embodiment, the individual identity information providing module 10 can provide (or determine) individual identity information that can differentiate and represent each user from other users. For example, the individual identity information providing module 10 can compare individual feature information of a specified user with individual feature information of other users previously stored in the individual feature information DB 20, and can provide individual identity information capable of differentiating the specified user. According to an embodiment, the individual identity information providing module 10 can compare the individual feature information of the specified user with individual identity information of other users previously provided and stored, and provide the individual identity information capable of differentiating the specified user. According to an embodiment, the individual identity information providing module 10 can compare the individual feature information of the specified user and the individual feature information and individual identity information of other users, and provide the individual identity information capable of differentiating the specified user.

For example, when one has frequently used a keyword "school" during a call or conversation with a specified user (or the contact 61 of the first user) using the application 50, but has not used the keyword "school" during a call or conversation with other users (or the contact 62 of the second user and the contact 63 of the third user) using the application 50, or a frequency of use is low, the individual identity information providing module 10 can provide the keyword "school" as individual identity information of the specified user. A detailed description thereof will be described in greater detail below with reference to FIG. 4A and FIG. 4B.

As another example, when one performs a call with the second user within a predetermined time (e.g., 1 minute) after a call with the first user, the individual identity information providing module 10 can provide relationship information between the first user and the second user, as individual identity information. A detailed description thereof will be described in greater detail below with reference to FIGS. 5A, 5B, 5C and 5D.

As a further example, when one has frequently performed a call or conversation with a specified user at "home" using the application 50, but has not performed a call or conversation with other users at home using the application 50, or a frequency is low, the individual identity information providing module 10 can provide location information of "home" as individual identity information of the specified user. A detailed description thereof will be described in greater detail below with reference to FIG. 6A and FIG. 6B.

As yet another example, when one has frequently performed a call or conversation with a specified user "while driving" using the application 50, but has not performed a call or conversation with other users "while driving" using the application 50, or a frequency is low, the individual identity information providing module 10 can provide context information of "while driving" as individual identity information of the specified user.

According to an embodiment, the individual identity information providing module 10 can store the provided individual identity information in the contact DB 60. According to an embodiment, the individual identity information providing module 10 can separately store the provided individual identity information in association with the contact DB 60. The individual identity information providing module 10 can integrate an individual identity keyword, an individual identity relationship, an individual identity location, and/or an individual identity context, and store individual identity information. For example, the individual identity information providing module 10 can integrate an individual identity keyword, an individual identity relationship, an individual identity location, and/or an individual identity context in an ontology manner, and store individual identity information. A detailed description thereof will be described in greater detail below with reference to FIG. 7.

Although not shown in FIG. 2, the memory 130 can include a contact search module. In response to a contact search request through a voice or text input, the contact search module can search for and provide at least one contact on the basis of individual identity information. A detailed description thereof will be described in greater detail below with reference to FIG. 8.

Although the individual identity information providing module 10, the individual feature information extraction module 30, and the individual data collection module 40 are illustrated and described as software modules in FIG. 2, at least some of the individual identity information providing module 10, the individual feature information extraction module 30 or the individual data collection module 40 can be implemented as a hardware-based module. For example, at least some of the individual identity information providing module 10, the individual feature information extraction module 30, or the individual data collection module 40 can be included in the processor 120, or be included in the electronic device 101 as a separate construction. As another example, at least some of the individual identity information providing module 10, the individual feature information extraction module 30, or the individual data collection module 40 can be implemented by the processor 120. Below, a function of the individual identity information providing module 10, the individual feature information extraction module 30 or the individual data collection module 40 will be described as the operation of the processor 120.

According to an embodiment, at least some of the individual identity information providing module 10, the individual feature information DB 20, or the individual feature information extraction module 30 can be included in a server (e.g., the server 108 in FIG. 1). For example, the electronic device 101 can collect individual data and transmit the same to a server, and the server can extract and store individual feature information from the received data, and provide individual identity information on the basis of the extracted individual feature information. According to an embodiment, the server can compare with the individual feature information extracted from the individual data received from other users at the time of providing individual identity information of a specified user, and provide the individual identity information of the specified user. Through this, the individual identity information can be more accurately provided. By not using (e.g., comparing) data collected from an electronic device of one user but using data collected from electronic devices of multiple users, the server can extract individual identity information (e.g., a keyword, a relationship, a location, and/or a context) capable of further differentiating a corresponding contact. For example, the server can, instead of simply determining that contacts who called within a specified time (e.g., 1 minute) after call end are related with each other, check whether there is an actual call between the contacts, and improve an accuracy of relationship provision, and accurately measure a degree of relationship (e.g., intimacy) between two contacts. The server can determine that a degree of relationship between contacts having the same photo is high. The server can determine that a degree of relationship between contacts who were in the same or similar location (place) at the same or similar time is high. The server can extract not only a location of a user of an electronic device but also a location (place) of the other party's contact at the time of using an application and thus, can determine the location of the user of the electronic device and/or the location of the other party's contact, as an individual identity location of the other party's contact. When the provision of individual identity information is completed, the server can transmit the provided individual identity information to the electronic device. The server can periodically or aperiodically update the individual identity information, and can transmit the updated individual identity information to the electronic device.

Figure 3:
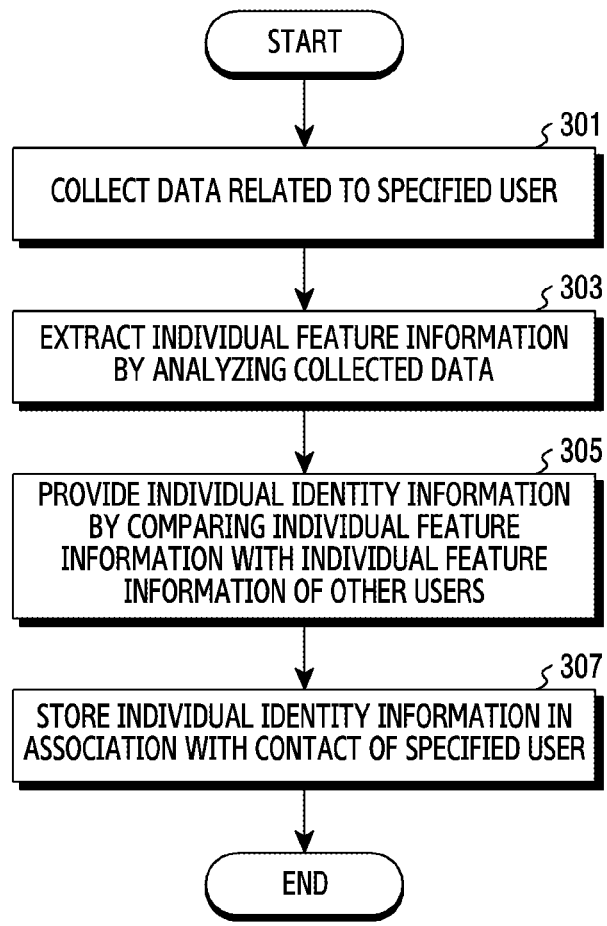
FIG. 3 is a flowchart illustrating an example method of providing individual identity information in an electronic device according to various embodiments.

FIG. 3 is a flowchart illustrating an example method of providing individual identity information in an electronic device according to various embodiments.

Referring to FIG. 3, in operation 301, a processor (e.g., the processor 120 of FIG. 1) of the electronic device (e.g., the electronic device 101 of FIG. 1) according to an embodiment of the present disclosure can collect data related to a specified user (or contact). For example, the processor (e.g., the individual data collection module 40 of FIG. 2) can collect the data related to the specified user from a plurality of applications. The data can include the content of a call with the specified user, the content of a conversation through a messenger or message, a photo, and/or sensing information (e.g., location and/or context information).

According to an embodiment, in operation 303, the processor (e.g., the individual feature information extraction module 30 of FIG. 2) can analyze the collected data, and extract (or provide) individual feature information. For example, the processor can analyze the collected data, and extract feature information related to the specified user. The feature information can include a keyword (e.g., a textbook or a homework), a relationship (e.g., dad, mom, younger brother, senior, or junior), a location (e.g., Seoul or Busan), context (e.g., while driving, before sleep, or on the way to work), a gender (demographic) and/or an age group.

According to an embodiment, in operation 305, the processor (e.g., the individual identity information providing module 10 of FIG. 2) can compare the individual feature information with individual feature information of other users, and provide (determine) individual feature information differentiated from the other users, as individual identity information. For example, the individual identity information can be information not overlapping, or minimally overlapping, with the other users, among at least one word frequently used when an application (e.g., the application 50 of FIG. 2) is used in relation to each user (or contact), a relationship with the specified user, and location (place) information mainly using an application in relation to the specified user, and/or context information when the application is used. According to an embodiment, the processor can compare the individual feature information of the specified user and the previously stored individual feature information and/or individual identity information of other users, and determine, as the individual identity information of the specified user, individual feature information differentiated (or distinguished) from the individual feature information of the other users, among the individual feature information of the specified user.

According to an embodiment, in operation 307, the processor (e.g., the individual identity information providing module 10 of FIG. 2) can store the individual identity information in association with a contact of the specified user. For example, the processor can include the individual identity information in the contact of the specified user. According to an embodiment, the processor can map the individual identity information with each contact and store in a separate DB.

Operations 301, 303, 305 and 307 of FIG. 3 can be performed based on a user stored in a contact DB (e.g., the contact DB 60 of FIG. 2), and can be updated continuously. The processor can provide and store individual identity information for contacts that are not stored in the contact DB. According to some embodiment, at least some of operation 303 to operation 307 can be performed by the server.

Figure 4A:
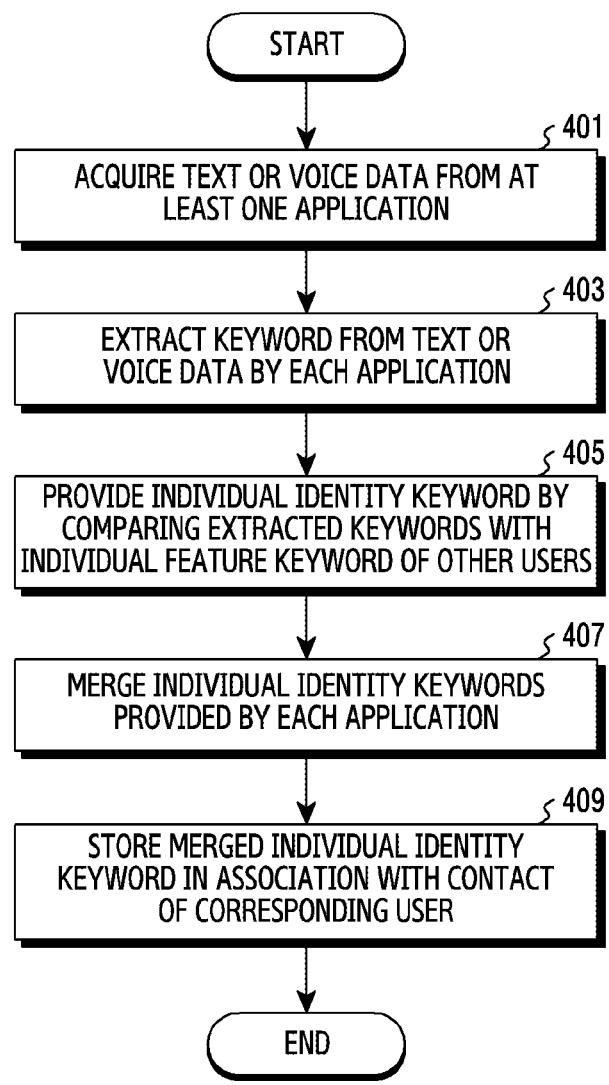
FIG. 4A is a flowchart illustrating an example method of providing an individual identity keyword among individual identity information in an electronic device according to various embodiments.

FIG. 4A is a flowchart illustrating an example method of providing an individual identity keyword among individual identity information in an electronic device according to various embodiments, and FIG. 4B is a diagram illustrating an example of providing an individual identity keyword in the electronic device according to various embodiments.

Referring to FIG. 4A and FIG. 4B, in operation 401, a processor (e.g., the processor 120 of FIG. 1) of the electronic device (e.g., the electronic device 101 of FIG. 1) of an embodiment of the present disclosure can acquire text data or voice data from at least one application (e.g., the application 50 of FIG. 2). For example, the processor can acquire voice data from a call application (e.g., the call application 51 of FIG. 2), and can acquire text data from a messenger application (e.g., the messenger application 52 of FIG. 2) and/or a text message application (e.g., the text message application 53 of FIG. 2), and can acquire text data (e.g., tag information of a photo) from a gallery application (e.g., the gallery application 54 of FIG. 2).

According to an embodiment, in operation 403, the processor can extract a keyword from the text or voice data by each application. For example, the processor can convert voice data into text data using a voice recognition (e.g., automatic speech recognition (ASR) or speech to text (STT)) technology, and analyze the converted text data and the collected text data (e.g., word/morpheme analysis) and extract a frequently used word (e.g., a word used at a specified number of times (e.g., 3 times) or more) as the keyword. For example, as in a drawing of a reference numeral 410 of FIG. 4B, the processor can store extracted keywords by contact. For example, the extracted keywords can be stored in the individual feature information DB 20. Reference numeral 410 illustrates an example keyword extracted from one application for description's convenience sake. However, each contact can store a keyword for each of a plurality of applications.

According to an embodiment, the processor can extract and store a keyword even for a contact that is not stored in a contact DB. For example, when a call is made with a user who is not stored in the contact DB, the processor can extract a keyword for a corresponding user, from call content.

Referring to reference numeral 410 of FIG. 4B, keywords of a first contact (Cheongdam April) can include "English textbook, English homework, progress table, live class, curriculum, and phone", and keywords of a second contact (Samsung Kindergarten) can include "teacher, going to school, love class, English homework, phone, and leaving kindergarten", and keywords of a third contact (Eunwoo's mother) can include "working mom, parenting, love class, kids cafe, English homework, phone, going to school, and leaving kindergarten", and keywords of a fourth contact (senior Park) can include "task, program, off work, lunch, health, and phone", and keywords of a fifth contact (junior Kim) can include "Bixby, task, vacation, off work, lunch, music, health, and phone". In the drawing of reference numeral 410, a keyword positioned in front can refer, for example, to a frequency of use being higher.

According to an embodiment, in operation 405, the processor can compare the extracted keywords with individual feature keywords of other users, to provide an individual identity keyword. For example, the processor can provide, as the individual identity keyword, a keyword not overlapping with keywords of other users or having a low overlapping frequency, among the extracted keywords.

According to some embodiment, the processor can assign a weight to the individual identity keyword. According to an embodiment, the processor can assign a weight to the individual identity keyword using a text mining technique. For example, the processor can calculate a weight of the individual identity keyword using, for example, a term frequency-inverse document frequency (TF-IDF) technique of <Equation 1> below. The TF-IDF is a weight used in information searching and text mining, and when there is a document group including several documents, can represent a statistical value indicating how important a word is in a specified document. The TF-IDF can be used to extract a keyword from a document or to find a degree of similarity between documents. Term frequency (TF) is a value indicating how often a specified word appears in a document. It can be determined that the higher this value is, the more important it is in the document. However, when the word itself is frequently used within a document group, this can refer, for example, to the word appearing frequently. This is called a document frequency (DF), and the inverse of this value is called an inverse document frequency (IDF). The TF-IDF can be a value obtained by multiplying the TF and the IDF. This is only an example, and the weight can be assigned to the individual identity keyword using various techniques.

$$\text{For a term } i \text{ in document } j: w_{i,j} = tf_{i,j} \times \log\left(\frac{N}{df_i}\right) \quad \langle\text{Equation 1}\rangle$$

$tf_{i,j}$ = number of occurrences of $i$ in $j$ $df_i$ = number of documents containing $i$ $N$ = total number of documents In <Equation 1> above, the "W" may refer to a weight, the "document j" may refer to text data for each contact, and the "term i" may refer to an extracted keyword, and the "$tf_{i,j}$" may refer to the number of extractions of a keyword "term i" extracted from text data "document j" for each contact, and the "$df_i$" may refer to the number of text data for each contact including the extracted keyword "term i", and the "N" may refer to the total number of text data for each contact.

Referring to reference numeral 420 of FIG. 4B, on the basis of order in which weights are high (order of being frequently used by a corresponding contact, but not being used, or not being frequently used, by other contacts), individual identity keywords of the first contact (Cheongdam April) can be determined as "progress table, live class, curriculum, English textbook, English homework, and phone", and individual identity keywords of the second contact (Samsung Kindergarten) can be determined as "love class, teacher, going to school, leaving kindergarten, English homework, and phone", and individual identity keywords of the third contact (Eunwoo's mother) can be determined as "working mom, parenting, kids cafe, teacher, going to school, leaving kindergarten, English homework, and phone", and individual identity keywords of the fourth contact (senior Park) can be determined as "program, lunch, task, work, off work, health, and phone", and individual identity keywords of the fifth contact (junior Kim) can be determined as "Bixby, music, lunch, vacation, off work, health, and phone".

According to an embodiment, in operation 407, the processor can merge the individual identity keywords provided by each application. For example, the processor can merge at least one individual identity keyword provided from a call application and at least one individual identity keyword provided from a message application. For example, the processor can merge the same or similar individual identity keywords into one. The similarity of the individual identity keywords can be calculated using, for example, a Jaccard coefficient. Jaccard coefficient is one of methods for measuring the similarity between two sets, and can be referred to as Jaccard index or Jaccard similarity. For example, when assuming that a set of at least one individual identity keyword provided from the call application is A and a set of at least one individual identity keyword provided from the message application is B, Jaccard coefficient can be defined as in Equation 2. According to a Jaccard coefficient algorithm, the processor can acquire '1' when the two sets (A, B) are the same as each other, and '0' as a result value when there is no common element in the two sets (A, B). In other cases, the processor can acquire a value between 0 and 1 as a result value, on the basis of Equation 2 below.

$$J(A,B)=(|A \cap B|)/(|A \cup B|)$$ Equation 2>

This is only an example, and the similarity of individual identity keywords can be calculated using various known similarity calculation algorithms. For example, the similarity of individual identity keywords can be calculated using a string matching algorithm and/or a cosine similarity algorithm as well.

For another example, the processor can delete an individual identity keyword with low priority so that each contact includes a specified number (e.g., 10) or less of individual identity keywords. For further example, the processor can merge contacts having the same or similar name into one. For example, even if a name stored in a first application and a name stored in a second application are not the same for the same user, when a degree of similarity between names or a degree of similarity between individual identity keywords is greater than or equal to a specified value, the processor can merge an individual identity keyword provided based on the first application and an individual identity keyword provided based on the second application, into one individual identity keyword.

According to an embodiment, in operation 409, the processor can store the merged individual identity keyword in association with a contact of a corresponding user.

Figure 5A:
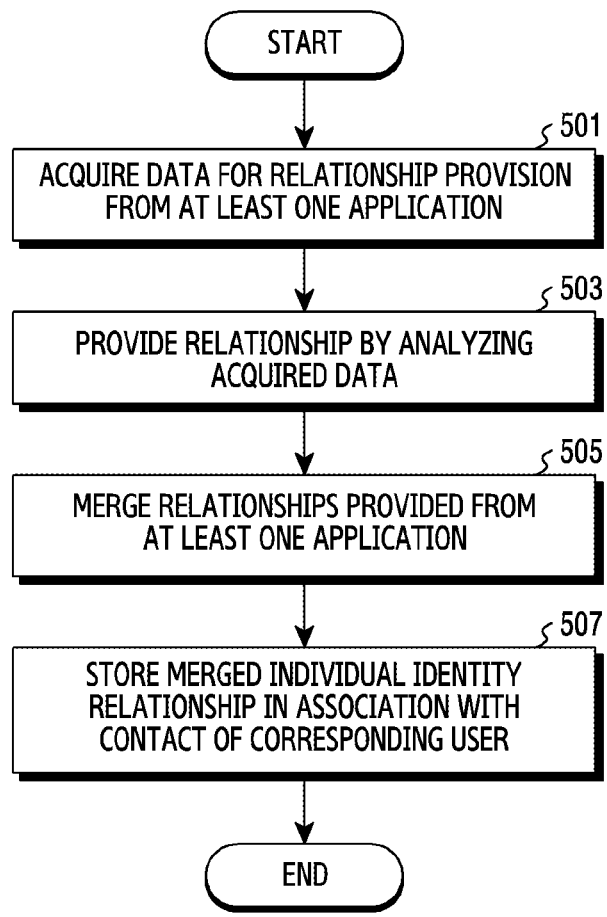
FIG. 5A is a flowchart illustrating an example method of providing an individual identity relationship among individual identity information in an electronic device according to various embodiments.
Figure 5B:
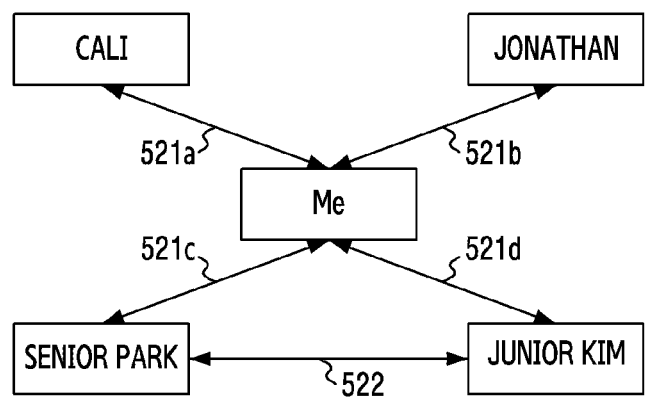
FIG. 5B is a diagram illustrating an example of providing an individual identity relationship using a call time according to various embodiments.
Figure 5C:
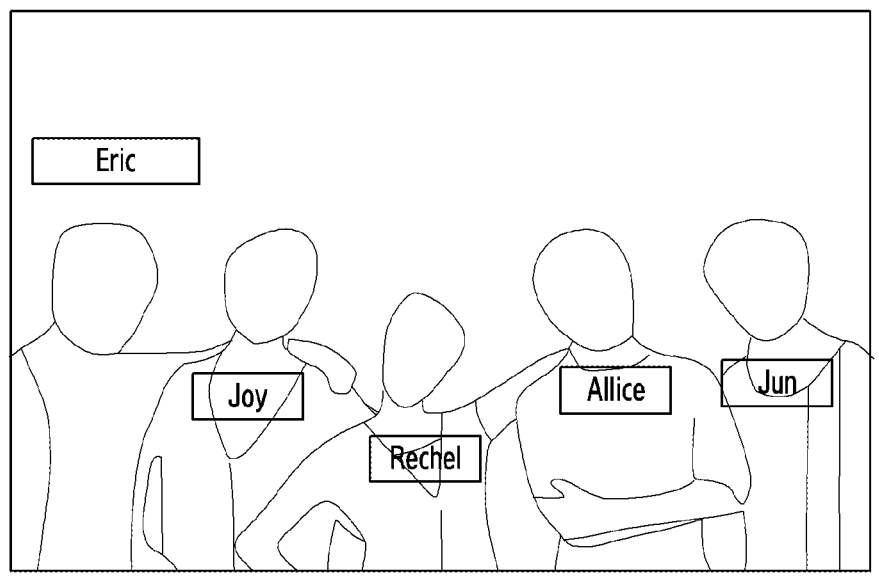
FIG. 5C is a diagram illustrating an example of providing an individual identity relationship using a photo according to various embodiments.

FIG. 5A is a flowchart illustrating an example method of providing an individual identity relationship among individual identity information in an electronic device according to various embodiments, FIG. 5B is a diagram illustrating an example of providing an individual identity relationship using a call time according to various embodiments, FIG. 5C is a diagram illustrating an example of providing an individual identity relationship using a photo according to various embodiments, and FIG. 5D is a diagram illustrating an example of providing an individual identity relationship using an individual identity keyword according to various embodiments.

Referring to FIGS. 5A, 5B, 5C and 5D, a processor (e.g., the processor 120 of FIG. 1) of the electronic device (e.g., the electronic device 101 of FIG. 1) according to an embodiment of the present disclosure can, in operation 501, acquire data for relationship provision from at least one application. The data for relationship provision can include the number of calls, a call time, call content, a photo, and/or an individual identity keyword.

According to an embodiment, in operation 503, the processor can provide a relationship by analyzing the acquired data. For example, the processor can provide relationships 521a, 521b, 521c, and/or 521d between contacts who have made more than one call and a user (e.g., "me" in a drawing of reference numeral 520 of FIG. 5B) of the electronic device.

As another example, the processor can provide a relationship on the basis of the call time and/or the number of calls. For example, as in a diagram of reference numeral 510 of FIG. 5B, when a user of the electronic device calls with a second user (e.g., junior Kim) at a specified number of times or more (e.g., twice) within a predetermined time (e.g., 1 minute) after calling with a first user (e.g., senior Park), the processor can provide a relationship (reference numeral 522 of FIG. 5B) between the first user and the second user.

As a further example, the processor can provide a relationship by analyzing the photo. For example, as shown in FIG. 5C, the processor can extract each user by analyzing a photo 530, and recognize users' contacts by comparing with users' photos registered to a contact list, and provide relationships between users (e.g., "Eric", "Joy", "Rechel", "Allice", and "Jun") who took a photo together. According to some embodiment, the processor can provide a relationship between contacts in which a frequency of taking a photo together is a specified number of times (e.g., 3 times) or more.

As yet another example, the processor can provide a relationship, based on the individual identity keyword. For example, as shown in FIG. 5D, the processor can provide a relationship between contacts of the same group, by grouping contacts including similar individual identity keywords. The processor can provide a relationship between contacts (e.g., "Cheongdam April" and "Jubilee Language School") included in Group 1, and can provide a relationship between contacts (e.g., "Kim sam-sung", "senior Park", and "junior Kim") included in Group 2.

According to an embodiment, in operation 505, the processor can merge the individual identity relationships provided from at least one application. For example, the processor can merge the individual identity relationships each provided through the analysis of the number of calls, the call time, the call content, and/or the group photo. For example, the processor can merge the same or similar individual identity relationships for each contact, into one. For example, the processor can merge the similar individual identity relationships using a Jaccard coefficient and/or the number of incoming links, the number of outgoing links, and a distance between contacts of a network topology structure (e.g., a diagram of reference numeral 520 of FIG. 5B) indicating a relationship. This is only an example, and the individual identity relationship can be merged using various similarity calculation algorithms.

According to an embodiment, in operation 507, the processor can store the merged individual identity relationship in association with a contact of a corresponding user.

Figure 6A:
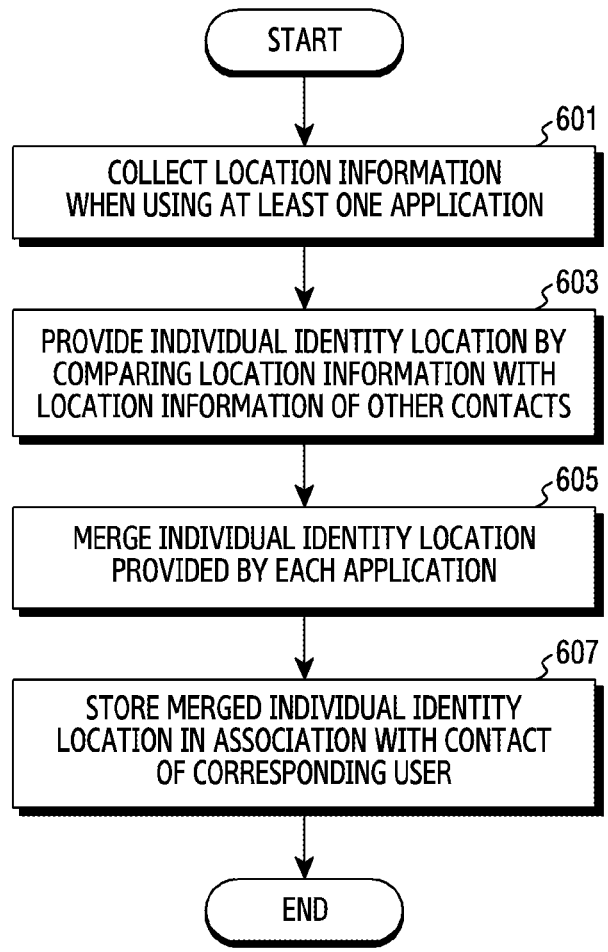
FIG. 6A is a flowchart illustrating an example method of providing an individual identity location among individual identity information in an electronic device according to various embodiments.
Figure 6B:
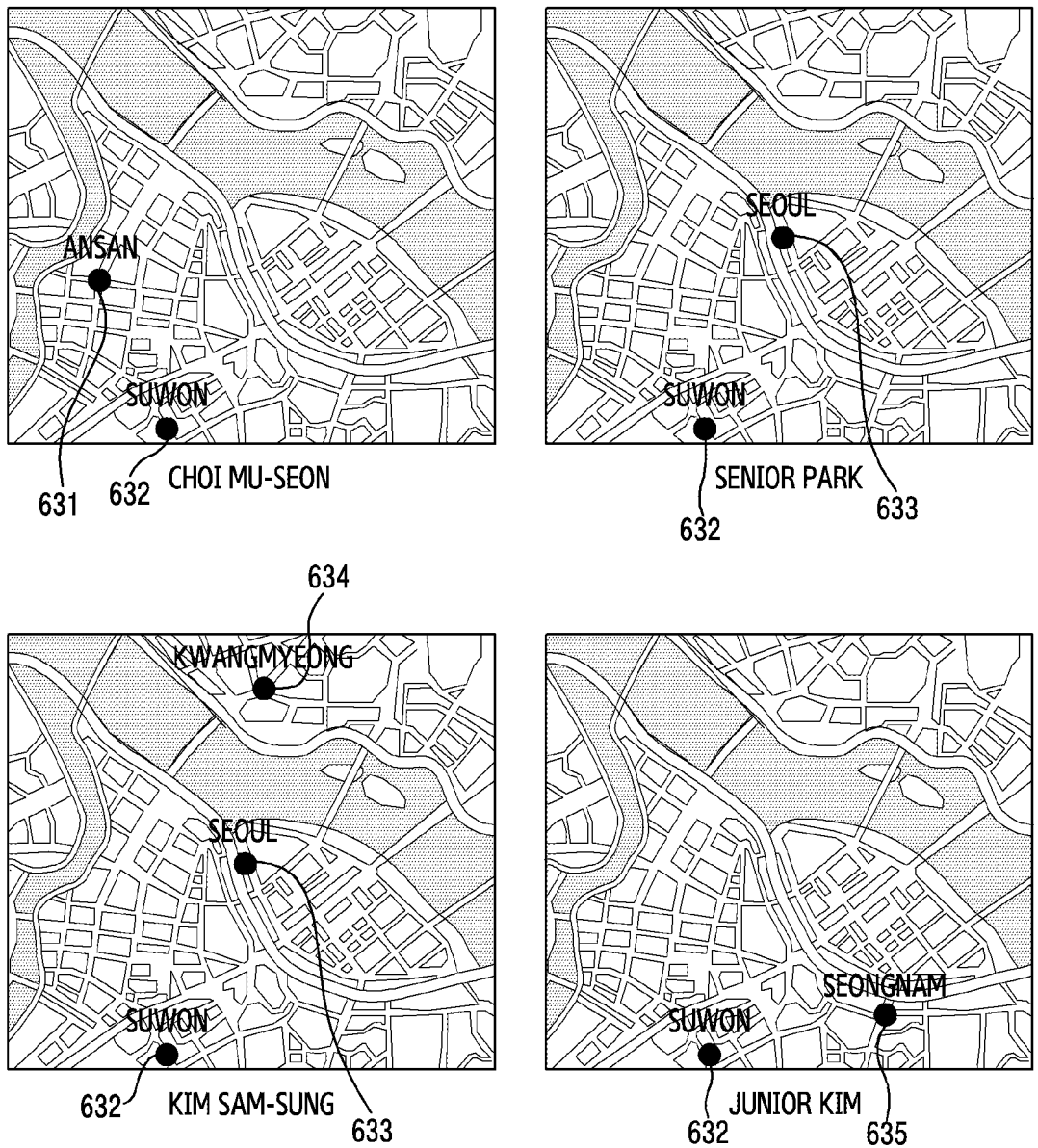
FIG. 6B is a diagram illustrating an example of providing an individual identity location in an electronic device according to various embodiments

FIG. 6A is a flowchart illustrating an example method of providing an individual identity location among individual identity information in an electronic device according to various embodiments, and FIG. 6B is a diagram illustrating an example of providing an individual identity location in the electronic device according to various embodiments.

Referring to FIG. 6A and FIG. 6B, in operation 601, a processor (e.g., the processor 120 of FIG. 1) of the electronic device (e.g., the electronic device 101 of FIG. 1) according to an embodiment of the present disclosure can collect location information (e.g., a latitude/longitude and a time) when at least one application is used (or activated). According to an embodiment, the processor can collect place information (e.g., a house, a wedding hall, and a department store) using the location information as well. For example, the processor can receive place information about a current location by transmitting latitude and longitude information to a map server, or extract, as place information, an appointment place corresponding to a current time stored in a calendar application and/or an alarm application.

According to an embodiment, in operation 603, the processor can provide an individual identity location by comparing the collected location information with location information of other contacts. Referring to FIG. 6B, for example, when a user of the electronic device made a call with a first user (Choi mu-seon) in "Ansan 631" and "Suwon 632", and made a call with a second user (senior Park) in "Seoul 633" and "Suwon 632", and made a call with a third user (Kim sam-sung) in "Seoul 633", "Kwangmyeong 634" and "Suwon 632", and made a call with a fourth user (junior Kim) in "Seongnam 635" and "Suwon 632", the processor can provide Ansan 631 as an individual identity location of the first user, and provide Seoul 633 as an individual identity location of the second user, and provide Gwangmyeong 634 as an individual identity location of the third user, and provide Seongnam 635 as an individual identity location of the fourth user.

According to an embodiment, in operation 605, the processor can merge the individual identity locations provided from at least one application.

According to an embodiment, in operation 607, the processor can store the merged individual identity location in association with a contact of a corresponding user. Operation 605 is similar to operation 407 and operation 505 described above, and operation 607 is similar to operation 409 and operation 507, so a detailed description thereof may not be repeated here.

According to an embodiment, the processor can provide an individual identity context, on the basis of a context when an application is used. For example, when one frequently made a call with a specified user while driving, but did not make a call with other users while driving, or a frequency is low, the processor can provide a context "while driving" as an individual identity context of the specified user.

Figure 7:
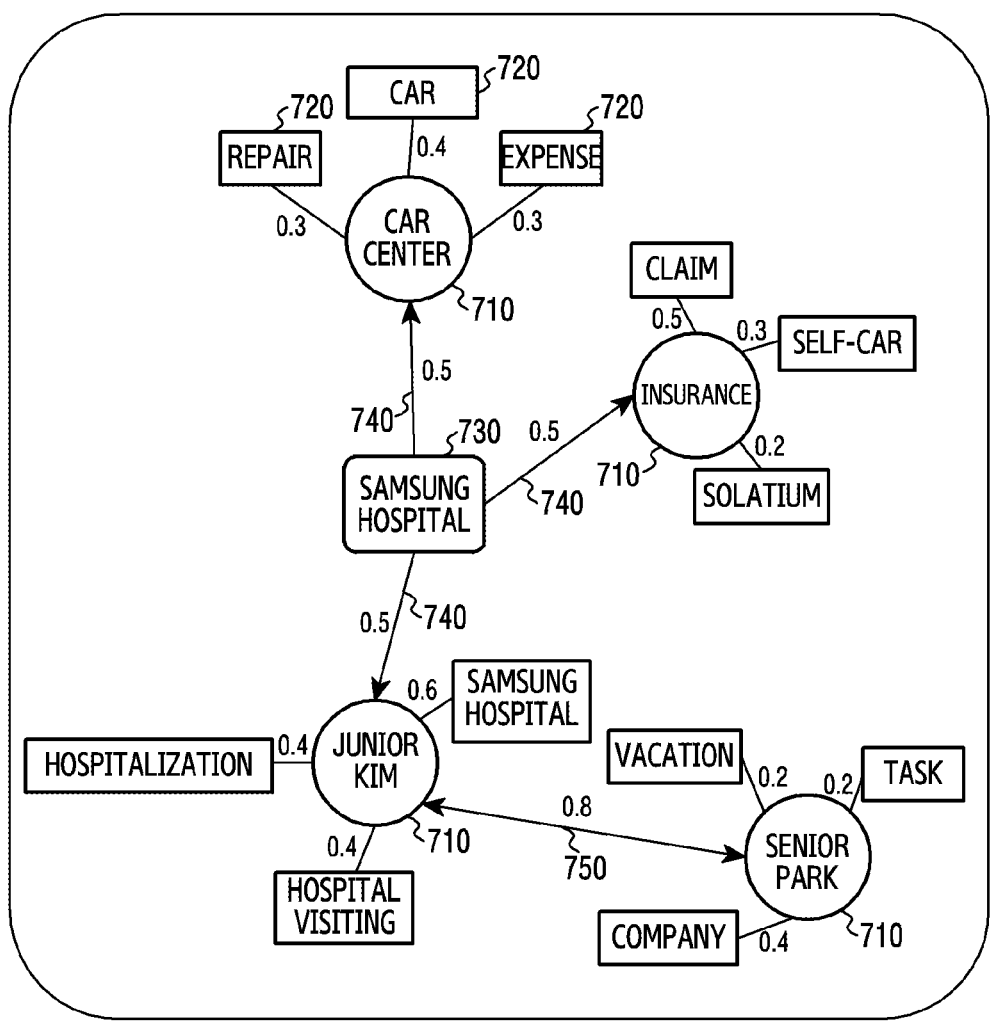
FIG. 7 is a diagram illustrating an example of integrating and storing individual identity information in an electronic device according various embodiments.

FIG. 7 is a diagram illustrating an example of integrating and storing individual identity information in an electronic device according to various embodiments.

Referring to FIG. 7, the electronic device of an embodiment of the present disclosure can integrate, in known various schemes, an individual identity keyword, an individual identity relationship, and an individual identity location which are provided through the above-described methods of FIGS. 4A to 6B. For example, as shown in FIG. 7, the individual identity keyword, the individual identity relationship, and the individual identity location can be integrated in an ontology scheme. In FIG. 7, circles 710 can indicate contacts, and squares 720 can indicate individual identity keywords, and rounded rectangles 730 can indicate individual identity locations, and arrows 740 and 750 can refer to individual identity relationships. The one-way arrow 740 can refer to a contact having been made from a location (or place) (e.g., Samsung hospital) to a contact (e.g., junior Kim, a car center, and an insurance company) of an arrow direction, and the two-way arrow 750 can refer to a relationship provided by making a call within a specified time (e.g., 1 minute). Numbers can refer to the weights calculated in <Equation 1> described above.

According to an embodiment, the electronic device can further integrate information such as an individual identity context, a gender, and/or an age group.

The aforementioned embodiment of the present disclosure can facilitate a search and improve an accuracy of search, compared to managing an individual identity keyword, an individual identity relationship, and an individual identity location respectively.

Figure 8:
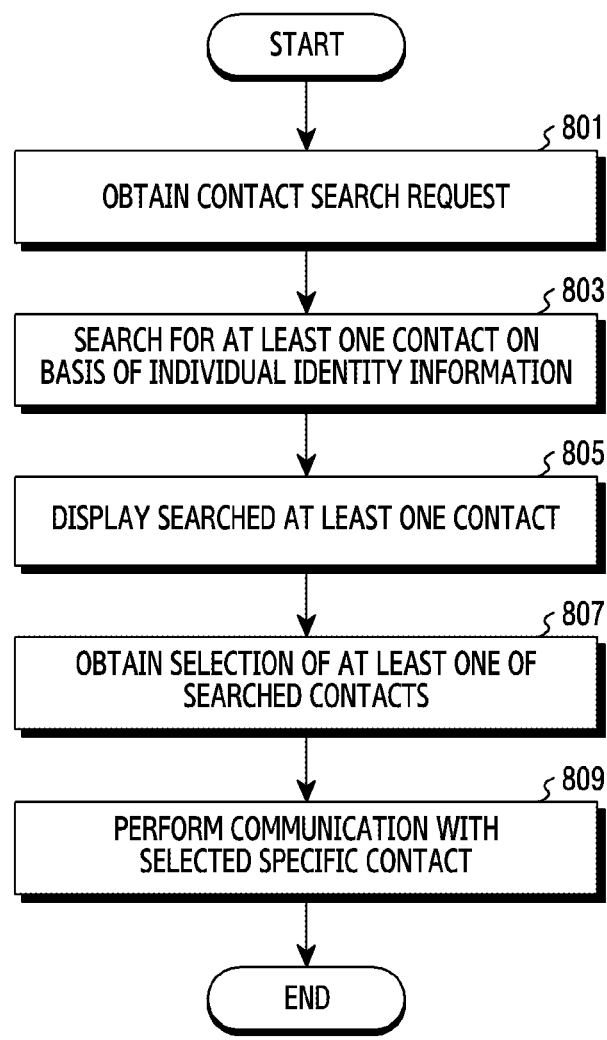
FIG. 8 is a flowchart illustrating an example method of searching for a contact in an electronic device according to various embodiments.
Figure 9A:
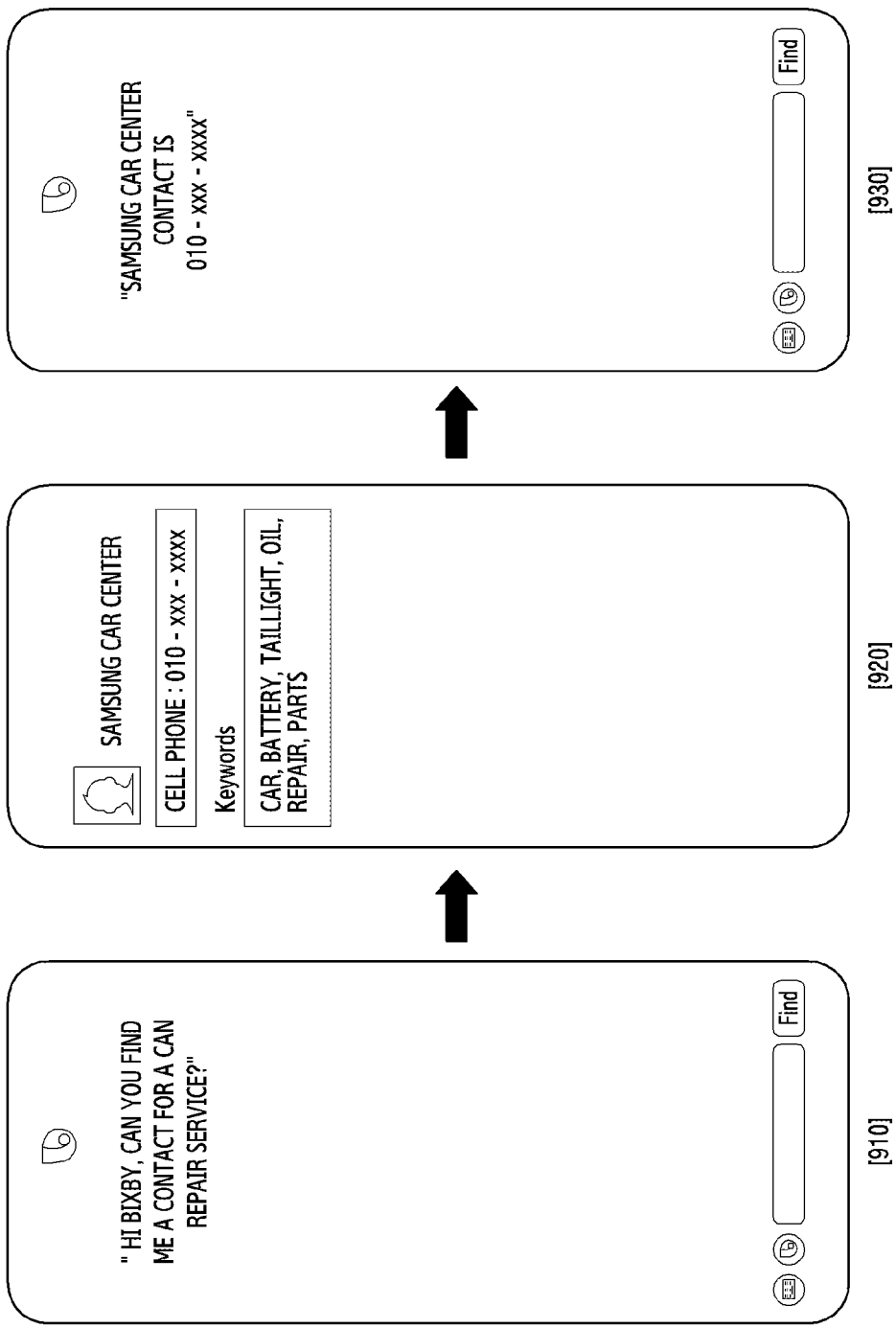
FIG. 9A is a diagram illustrating an example of displaying a contact which is searched using an individual identity keyword according to various embodiments.
Figure 9B:
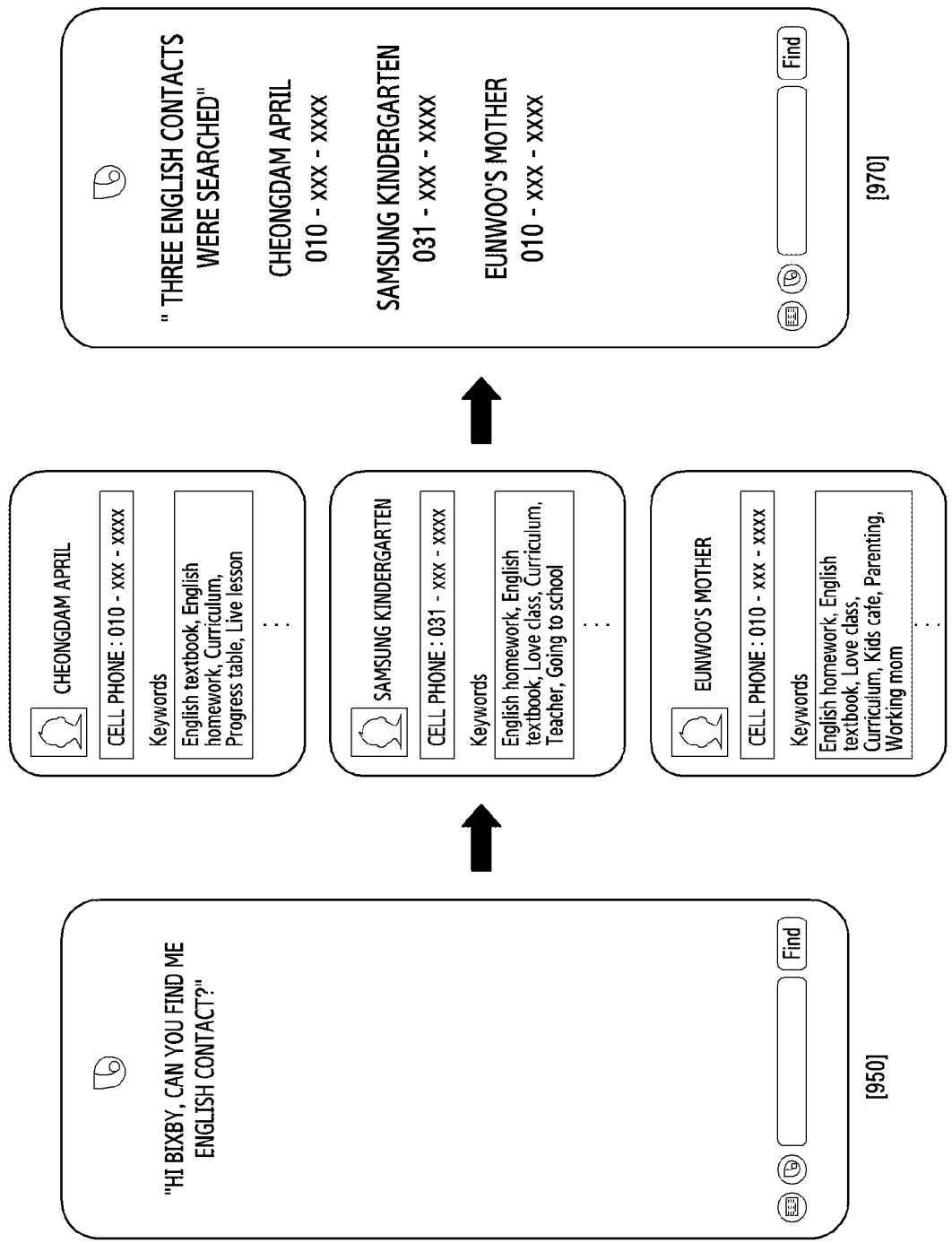
FIG. 9B is a diagram illustrating an example of displaying a contact which is searched using an individual identity keyword according to various embodiments.
Figure 10:
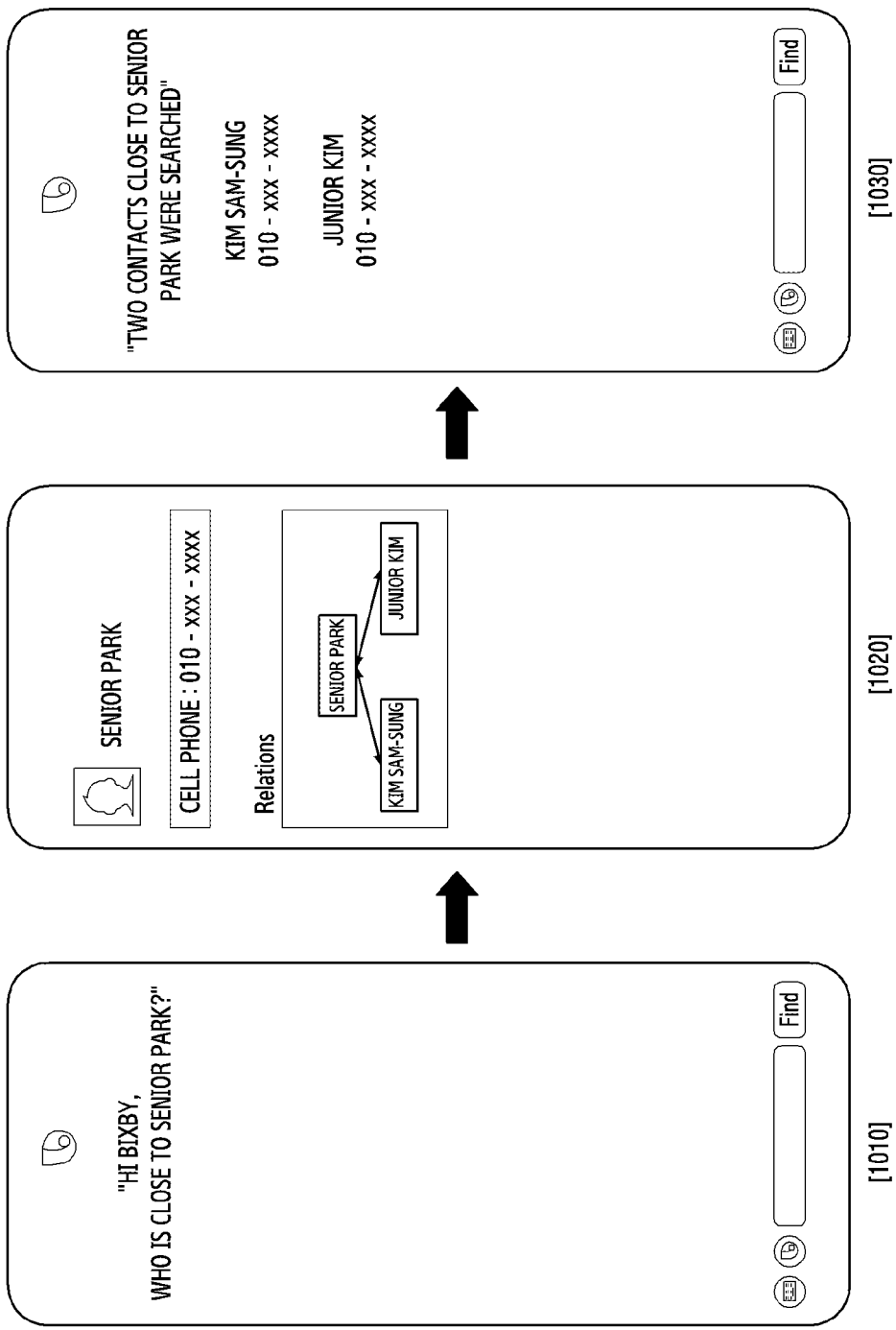
FIG. 10 is a diagram illustrating an example of displaying a contact which is searched using an individual identity relationship according to various embodiments.
Figure 11:
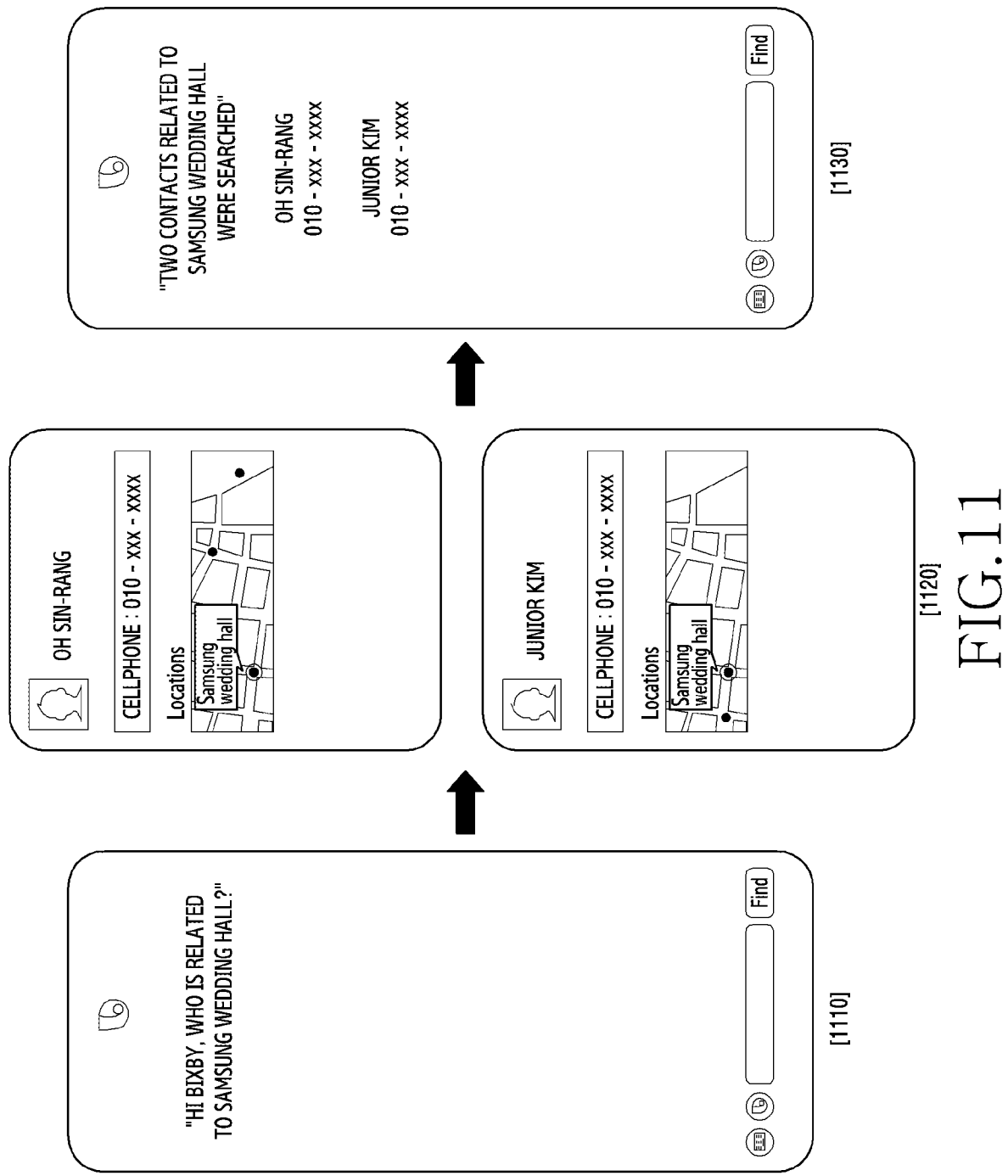
FIG. 11 is a diagram illustrating an example of displaying a contact which is searched using an individual identity location according to various embodiments.

FIG. 8 is a flowchart illustrating an example method of searching for a contact in an electronic device according to various embodiments, FIG. 9A and FIG. 9B are diagrams illustrating examples of displaying a contact which is searched using an individual identity keyword according to various embodiments, FIG. 10 is a diagram illustrating an example of displaying a contact which is searched using an individual identity relationship according to various embodiments, and FIG. 11 is a diagram illustrating an example of displaying a contact which is searched using an individual identity location according to various embodiments.

Referring to FIG. 8 to FIG. 11, a processor (e.g., the processor 120 of FIG. 1) of the electronic device (e.g., the electronic device 101 of FIG. 1) according to an embodiment of the present disclosure can, in operation 801, obtain a contact search request.

For example, when a user does not remember a name and a nickname which are used for storing a user's contact intended to be called, the user can request a search for the contact, using a remembered word (keyword) among call content with other user intended to be searched. For example, as in a diagram of reference numeral 910 of FIG. 9A, the user can utter "Hi Bixby, can you find me a contact for a car repair service?" using a keyword.

As another example, as in a diagram of reference numeral 950 of FIG. 9B, the user can utter "Hi Bixby, can you find me English contact?" using a keyword. According to an embodiment, the user can input a keyword "car repair" or "English" as a search word through an input module (e.g., the input module 150).

As another example, when the user does not remember a name of a first user intended to be called but remembers a name of a second user (e.g., "senior Park") close to the first user, the user can request a search for a contact using relationship information. For example, as in a diagram of reference numeral 1010 of FIG. 10, the user can utter "Hi Bixby, who is close to senior Park?" using the name of the second user. According to an embodiment, the user can input "person close to Senior Park" as a search word through an input module (e.g., the input module 150).

As a further example, when the user does not remember a name of other user intended to be called but remembers a location (or place) where a user frequently contacted (e.g., a call, a message, and a messenger) or met, the user can request a search for a contact using location information. For example, as in a diagram of reference numeral 1110 of FIG. 11, the user can make utterance such as "Hi Bixby, who is related to Samsung wedding hall?" using remembered location information (or place information). According to an embodiment, the user can input "person related to Samsung wedding hall" as a search word through an input module (e.g., the input module 150).

According to an embodiment, in operation 803, the processor can search for at least one contact on the basis of individual identity information.

For example, as in a diagram of reference numeral 920 of FIG. 9A, the processor can search, from an individual identity keyword DB, for at least one contact which includes "car repair" as an individual identity keyword. For another example, as in a diagram of reference numeral 960 of FIG. 9B, the processor can search, from the individual identity keyword DB, for at least one contact which includes "English" as an individual identity keyword.

As a further example, as in a diagram 1020 of FIG. 10, the processor can search, from the individual identity relationship DB, for at least one contact in which a relationship with "senior Park" has been provided. As yet another example, as in a diagram 1120 of FIG. 11, the processor can search, from the individual identity location DB, for at least one contact related to a location (or place) "Samsung wedding hall".

The drawings of reference numerals 920, 960, 1020, and 1120 are illustrated for description convenience's sake and may not be screens actually displayed on a display of the electronic device.

According to an embodiment, in operation 805, the processor can display the searched at least one contact. For example, the processor can display the searched at least one contact on the display, as in the drawing of reference numeral 930 of FIG. 9A, the drawing of reference numeral 970 of FIG. 9B, the drawing of reference numeral 1030 of FIG. 10, and the drawing of reference numeral 1130 of FIG. 11. According to some embodiment, when there is no search result, the processor can notify the user that there is no search result.

According to an embodiment, in operation 807, the processor can obtain a selection of any one of the searched contacts. For example, the processor can obtain a touch input to any one of the searched contacts.

According to an embodiment, in operation 809, the processor can perform communication (e.g., a call and/or a message) with the selected contact.

Figure 12:
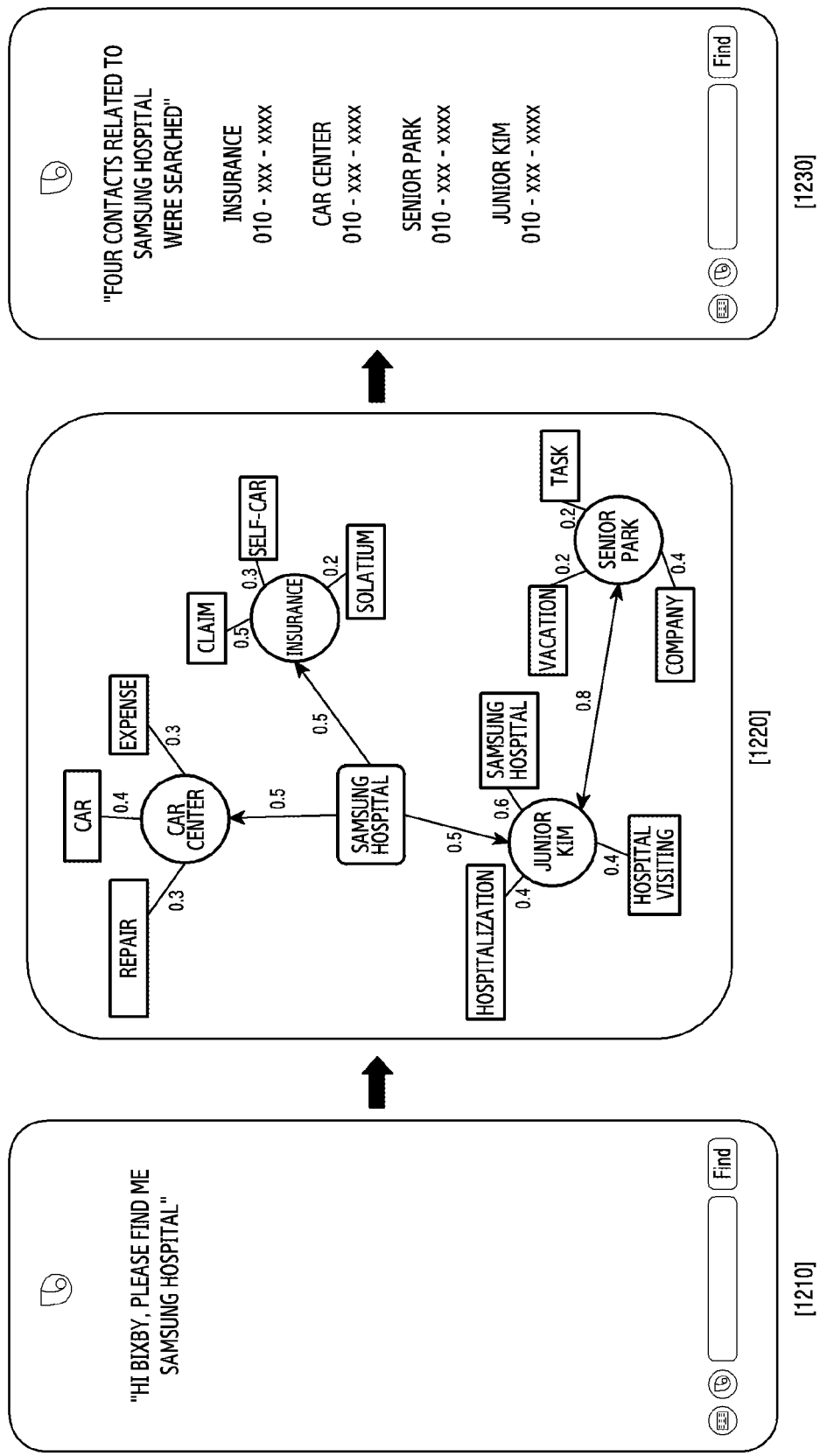
FIG. 12 is a diagram illustrating an example of displaying a contact which is searched using individual identity information according to various embodiments.

FIG. 12 is a diagram illustrating an example of displaying a contact which is searched using integrated individual identity information according to various embodiments.

Referring to FIG. 12, the electronic device (e.g., the electronic device 101 of FIG. 1) according to an embodiment of the present disclosure can search for and display a contact, from an integrated individual identity DB, in response to a contact search request. For example, as in a drawing of reference numeral 1210, the electronic device can obtain an utterance for searching for a contact. As in a drawing of reference numeral 1220, the electronic device can convert the utterance into a text, and extract a search word (e.g., Samsung hospital) from the converted text, and search for at least one contact from the integrated individual identity DB on the basis of the extracted search word. The integrated individual identity DB can be a DB for integrating and storing individual identity keyword, individual identity relationship, individual identity location, individual identity context, gender and/or age group information. As in a drawing of reference numeral 1230, the electronic device can display a search result which is searched using the integrated individual identity DB, on a display.

The drawing of reference numeral 1220 is illustrated for description convenience's sake, and may not be a screen actually displayed on the display of the electronic device.

The aforementioned embodiment of the present disclosure can improve an accuracy of search, by searching for all of an individual identity keyword, an individual identity relationship, an individual identity location, and an individual identity context when a contact search request is made.

Figure 13:
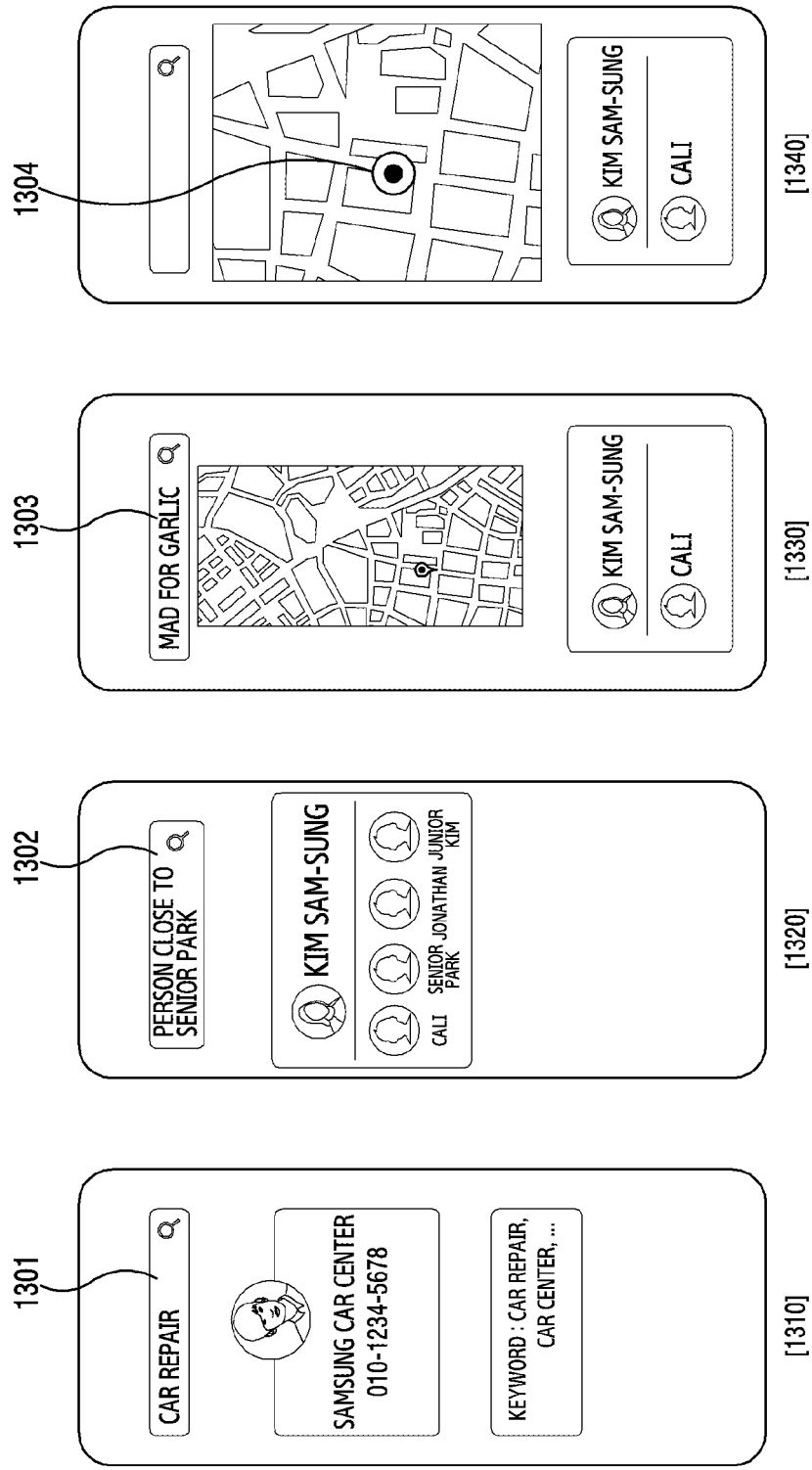
FIG. 13 is a diagram illustrating an example of searching for a contact using individual identity information according to various embodiments.

FIG. 13 is a diagram illustrating an example of searching for a contact using individual identity information according to various embodiments.

Referring to FIG. 13, a contact search using individual identity information of an embodiment of the present disclosure can be used in various applications of an electronic device (e.g., the electronic device 101 of FIG. 1). For example, as shown in FIG. 13, the electronic device can provide a search result of individual identity information when a search request is made from a finder application (e.g., S Finder™) capable of integrating and searching for information stored in the electronic device. The drawing of reference numeral 1310 of FIG. 13 is an example searched using a keyword 1301 (e.g., car repair), and the drawing of reference numeral 1320 is an example searched using a relationship 1302 (e.g., Kim sam-sung), and the drawing of reference numeral 1330 is an example searched using a place name 1303 (e.g., mad for garlic), and the drawing of reference numeral 1340 is an example searched using a location 1304. In an example of the drawing of reference numeral 1340, when a user selects (e.g., touches) a location on a map, a search result can be provided using corresponding location information (latitude and longitude coordinates) or place information of the corresponding location.

According to an embodiment, the electronic device can search for a contact using at least one of an individual identity keyword, an individual identity relationship, and an individual identity location. For example, the electronic device can analyze a search word, and can search for a contact using the individual identity relationship when the analysis result is that the search word is a term related to a relationship (e.g., "close"), and can search for a contact using the individual identity location when the analysis result is that the search word is a term related to a place (location) (e.g., a well-known trade name such as "mad for garlic"), and can search for a contact using the individual identity keyword when the analysis result is that the search word is a term having no relation to a relationship and a place (location).

FIG. 13 illustrates that the individual identity keyword, the individual identity relationship, and the individual identity location (place) are searched respectively but, as described in FIG. 12, the electronic device can search for all of the individual identity keyword, the individual identity relationship, and the individual identity location (place) and present the search result.

According to an embodiment, the electronic device can present a search result of individual identity information even at search, using Bixby™, a search function of a message application, or a search function of a web browser.

According to various example embodiments of the present disclosure, an electronic device (e.g., the electronic device 101) can include at least one processor (e.g., the processor 120), and a memory (e.g., the memory 130) operatively connected to the at least one processor, wherein the memory can store instructions which, when executed, cause the at least one processor to: collect data related to a contact of a specified user, extract at least one piece of individual feature information by analyzing the collected data, provide differentiated individual identity information by comparing the extracted individual feature information with individual feature information of other users, and store the provided individual identity information in the memory in association with the contact of the specific user.

According to various example embodiments, the individual identity information can include at least one of an individual identity keyword, an individual identity relationship, an individual identity location, an individual identity context, a gender, or an age group.

According to various example embodiments, the providing the individual identity information can include providing, as the individual identity keyword, a keyword which is not used or least used when using an application in relation to other users, among words frequently used when using an application in relation to the specified user.

According to various example embodiments, the providing the individual identity information can include providing a relationship between users including similar individual identity keywords, or providing a relationship with a contact who made a call at a specified number of times or more, providing a relationship between contacts who made a call within a specified time, or analyze a photo stored in a gallery and provide a relationship between users who took a photo together, to provide a individual identity relationship.

According to various example embodiments, the providing the individual identity information can include providing, as the individual identity location, location information or place information which is differentiated from location information or place information when using an application in relation to other users, among location information or place information when using an application in relation to the specified user.

According to various example embodiments, the providing the individual identity information can include providing, as the individual identity context, a context which is differentiated from a context when using an application in relation to other users, among contexts when using an application in relation to the specified user.

According to various example embodiments, the individual identity information can be acquired by integrating and storing at least one of a contact, the individual identity keyword, the individual identity relationship, the individual identity location, or the individual identity context.

According to various example embodiments, the collecting the data can include collecting the data from a plurality of applications, and the extracting the individual feature information can include extracting the individual feature information by each application, and the providing the individual identity information can include providing the individual identity information by each application.

According to various example embodiments, the providing the individual identity information can include merging individual identity information provided from each application.

According to various example embodiments, the electronic device can further include a display (e.g., the display module 160). The memory can further store instructions which, when executed, cause the at least one processor to, in response to a search request including the individual identity information, search for at least one contact based on the individual identity information, and display the searched at least one contact on the display.

According to various example embodiments of the present disclosure, a method for managing a contact in an electronic device (e.g., the electronic device 101) can include: collecting data related to a contact of a specified user, extracting at least one piece of individual feature information by analyzing the collected data, providing differentiated individual identity information by comparing the extracted individual feature information with individual feature information of other users, and storing the provided individual identity information in association with a contact of the specific user.

According to various example embodiments, the individual identity information can include at least one of an individual identity keyword, an individual identity relationship, an individual identity location, an individual identity context, a gender, or an age group.

According to various example embodiments, the providing of the individual identity information can include providing, as the individual identity keyword, a word which is not used or is least used when using an application in relation to other users, among words frequently used when using an application in relation to the specified user.

According to various example embodiments, the providing of the individual identity information can include at least one of determining that there is a relationship between users including similar individual identity keywords, determining that there is a relationship with a contact who has called at a specified number of times or more, determining that there is a relationship between contacts who have called within a specified time period, or determining that there is a relationship between users who took photos together by analyzing a photo stored in a gallery.

According to various example embodiments, the providing of the individual identity information can include providing, as the individual identity location, location information or place information which is differentiated from location information or place information when using an application in relation to other users, among location information or place information when using an application in relation to the specified user.

According to various example embodiments, the providing of the individual identity information can include providing, as the individual identity context, a context which is differentiated from a context when using an application in relation to other users, among contexts when using an application in relation to the specified user.

According to various example embodiments, the storing can include integrating and storing at least one of the individual identity keyword, the individual identity relationship, the individual identity location, or the individual identity context, for each contact.

According to various example embodiments, collecting the data can include collecting the data from a plurality of applications. The extracting of the individual feature information can include extracting the individual feature information by each application. The providing of the individual identity information can include providing the individual identity information by each application.

According to various example embodiments, the providing of the individual identity information can include merging individual identity information provided from each application.

According to various example embodiments, the method can include, in response to a search request including the individual identity information, searching for at least one contact based on the individual identity information, and displaying the searched at least one contact on a display.

The electronic device according to various example embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a microphone;
at least one processor; and
memory storing instructions,
wherein the instructions, when executed by the at least one processor, cause the electronic device to:
collect voice data related to a contact of a specified user through the microphone, from at least one application;
extract at least one piece of individual feature information by analyzing the collected voice data by the at least one application;
provide, as individual identity information, information that is not used or least used when using the at least one application in relation to other users, among information frequently used when using the at least one application in relation to the specified user;
merge the provided individual identity information;
store the merged individual identity information in the memory in association with the contact of the specific user;
in response to a search request comprising the individual identity information, search for at least one contact based on the individual identity information; and
output the searched at least one contact.

2. The electronic device of claim 1, wherein the individual identity information comprises at least one of an individual identity keyword, an individual identity relationship, an individual identity location, an individual identity context, a gender, or an age group.

3. The electronic device of claim 2, wherein the providing the individual identity information includes providing, as the individual identity keyword, a keyword that is not used or least used when using an application in relation to other users, among words frequently used when using an application in relation to the specified user.

4. The electronic device of claim 2, wherein the providing the individual identity information includes at least one of:
providing relationships between users comprising similar individual identity keywords,
providing a relationship with a contact who has called at a specified number of times or more,
providing a relationship between contacts who have called within a specified time period, or
by analyzing photos stored in a gallery, providing a relationship between users who took a photo together and providing an individual identity relationship.

5. The electronic device of claim 2, wherein the providing the individual identity information includes providing, as the individual identity location, location information or place information that is differentiated from location information or place information when using an application in relation to other users, among location information or place information when using an application in relation to the specified user.

6. The electronic device of claim 2, wherein the providing the individual identity information includes providing, as the individual identity context, a context that is differentiated from a context when using an application in relation to other users, among contexts when using an application in relation to the specified user.

7. The electronic device of claim 2, wherein the individual identity information is acquired by integrating and storing at least one of the contact, the individual identity keyword, the individual identity relationship, the individual identity location, or the individual identity context.

8. The electronic device of claim 1, wherein the collecting the data comprises collecting the data from a plurality of applications,
the extracting the individual feature information comprises extracting the individual feature information by each application, and
the providing the individual identity information comprises providing the individual identity information by each application.

9. The electronic device of claim 8, wherein the providing the individual identity information comprises merging individual identity information provided from each application.

10. The electronic device of claim 1, further comprising a display,
wherein the memory further stores instructions which, when executed, cause the electronic device to:
in response to a search request comprising the individual identity information, search for at least one contact based on the individual identity information; and
control the display to display the searched at least one contact on the display.

11. A method for managing contacts in an electronic device, the method comprising:
collecting voice data related to a contact of a specified user from at least one application;
extracting at least one piece of individual feature information by analyzing the collected voice data by the at least one application;
providing, as individual identity information, information that is not used or least used when using the at least one application in relation to other users, among information frequently used when using the at least one application in relation to the specified user;
merging the provided individual identity information;
storing the merged individual identity information in association with the contact of the specific user;
in response to a search request comprising the individual identity information, searching for at least one contact based on the individual identity information; and
outputting the searched at least one contact.

12. The method of claim 11, wherein the individual identity information comprises at least one of an individual identity keyword, an individual identity relationship, an individual identity location, an individual identity context, a gender, or an age group.

13. The method of claim 12, wherein providing the individual identity information comprises providing, as the individual identity keyword, a keyword that is not used or least used when using an application in relation to other users, among words frequently used when using an application in relation to the specified user.

14. The method of claim 12, wherein providing the individual identity information comprises at least one of:
determining that there is a relationship between users comprising similar individual identity keywords;
determining that there is a relationship with a contact who has called at a specified number of times or more;
determining that there is a relationship between contacts who have called within a specified time period; or
by analyzing a photo stored in a gallery, determining that there is a relationship between users who took the photo together.

15. The method of claim 12, wherein providing the individual identity information comprises providing, as the individual identity location, location information or place information that is differentiated from location information or place information when using an application in relation to other users, among location information or place information when using an application in relation to the specified user.

16. The method of claim 12, wherein providing the individual identity information comprises providing, as the individual identity context, a context that is different from a context when using an application in relation to other users, among contexts when using an application in relation to the specified user.

17. The method of claim 12, wherein storing comprises integrating and storing at least one of the individual identity keyword, the individual identity relationship, the individual identity location, or the individual identity context, for each contact.

18. The method of claim 11, wherein the collecting of the data comprises collecting the data from a plurality of applications,
the extracting of the individual feature information comprises extracting the individual feature information by each application, and
the providing of the individual identity information comprises providing the individual identity information by each application.

19. The method of claim 18, wherein providing the individual identity information comprises merging individual identity information provided from each application.

20. The method of claim 11, further comprising:
in response to a search request comprising the individual identity information, searching for at least one contact based on the individual identity information; and
displaying the searched at least one contact on a display.

* * * * *